US012791763B2

(12) United States Patent
Ishii et al.

(10) Patent No.: US 12,791,763 B2
(45) Date of Patent: Nov. 10, 2026

(54) OPTICAL ELEMENT PROVIDED WITH ANTIREFLECTION FILM

(71) Applicant: NALUX CO., LTD., Osaka (JP)

(72) Inventors: Kenta Ishii, Osaka (JP); Yosuke Sakohira, Osaka (JP); Masanori Endo, Osaka (JP); Toshiyuki Kodama, Osaka (JP)

(73) Assignee: NALUX CO., LTD., Osaka (JP)

( * ) Notice: Subject to any disclaimer, the term of this patent is extended or adjusted under 35 U.S.C. 154(b) by 153 days.

(21) Appl. No.: 18/826,707

(22) Filed: Sep. 6, 2024

(65) Prior Publication Data

US 2024/0427060 A1 Dec. 26, 2024

Related U.S. Application Data

(63) Continuation of application No. PCT/JP2023/004144, filed on Feb. 8, 2023.

(Continued)

(51) Int. Cl.

*G02B 1/115* (2015.01)
*G02B 3/00* (2006.01)
*G02B 27/00* (2006.01)

(52) U.S. Cl.

CPC ............ *G02B 1/115* (2013.01); *G02B 3/0012* (2013.01); *G02B 3/0056* (2013.01); *G02B 27/0012* (2013.01)

(58) Field of Classification Search

CPC ........... G02B 1/115; G02B 1/11; G02B 1/111; G02B 1/113; G02B 1/116; G02B 1/118;

(Continued)

(56) References Cited

U.S. PATENT DOCUMENTS

| | | | |
|---|---|---|---|
| 6,352,359 | B1 | 3/2002 | Shie et al. |
| 2002/0145797 | A1 | 10/2002 | Sales |

(Continued)

FOREIGN PATENT DOCUMENTS

| | | | |
|---|---|---|---|
| EP | 3 165 873 | A1 | 5/2017 |
| EP | 3 282 293 | A1 | 2/2018 |

(Continued)

OTHER PUBLICATIONS

Kodama et al., WO 2022/168565, English language machine translation, published Aug. 11, 2022, machine translation generated Apr. 3, 2026 (Year: 2022).*

(Continued)

*Primary Examiner* — Stephone B Allen
*Assistant Examiner* — Adam W Booher
(74) *Attorney, Agent, or Firm* — SQUIRE PATTON BOGGS (US) LLP

(57) ABSTRACT

A combination of an optical element and an antireflection film, the optical element being provided with a microlens array and configured to diverge a light beam, the maximum angle of a diverged ray to a reference axis being D, wherein in each microlens $$Z/P \geq 0.8$$

is satisfied, where Z represents distance between the vertex and the bottom and P represents the diameter of the smallest circle enclosing the bottom and the antireflection film being designed such that $$\{T(0)/T(D)\}/\{T'(0)/T'(D)\} \leq 0.85$$

(Continued)

is satisfied, where T(0) and T(D) respectively represent transmittance of the film formed on a substrate made of the material of the optical element for incident rays at 0 and D, and T'(0) and T'(D) respectively represent transmittance of the substrate without an antireflection film for incident rays at 0 and D, wherein the combination is configured so as to realize a target intensity distribution of diverged rays.

6 Claims, 12 Drawing Sheets

Related U.S. Application Data

(60) Provisional application No. 63/392,675, filed on Jul. 27, 2022, provisional application No. 63/335,891, filed on Apr. 28, 2022.

(58) Field of Classification Search
CPC ...... G02B 3/00; G02B 3/0006; G02B 3/0012; G02B 3/0037; G02B 3/0043; G02B 3/0056; G02B 3/0068; G02B 3/02; G02B 27/0012; G02B 5/188; G02B 5/1885; G02B 2003/0093
See application file for complete search history.

(56) References Cited

U.S. PATENT DOCUMENTS

| | | | |
|---|---|---|---|
| 2008/0049165 | A1 | 2/2008 | Min et al. |
| 2015/0377450 | A1 | 12/2015 | Suh et al. |
| 2017/0123218 | A1 | 5/2017 | Stigwall et al. |
| 2018/0113240 | A1 | 4/2018 | Watanabe et al. |
| 2020/0018827 | A1 | 1/2020 | Yamamoto |
| 2020/0133012 | A1 | 4/2020 | Sales |
| 2022/0238761 | A1 | 7/2022 | Takeda et al. |
| 2023/0251405 | A1 | 8/2023 | Ishii et al. |

FOREIGN PATENT DOCUMENTS

| | | | |
|---|---|---|---|
| EP | 3 581 844 | A1 | 12/2019 |
| EP | 3 644 110 | A1 | 4/2020 |
| EP | 3 965 173 | A1 | 3/2022 |
| JP | 2002-523861 | A | 7/2002 |
| JP | 2005-173029 | A | 6/2005 |
| JP | 2008-052280 | A | 3/2008 |
| JP | 2010015186 | A | 1/2010 |
| JP | 2013-025318 | A | 2/2013 |
| JP | 2016-510130 | A | 4/2016 |
| JP | 2017-097058 | A | 6/2017 |
| JP | 2020-067664 | A | 4/2020 |
| JP | 2021-002632 | A | 1/2021 |
| WO | 00/10835 | A1 | 3/2000 |
| WO | 02/077672 | A2 | 10/2002 |
| WO | 2016/163125 | A1 | 10/2016 |
| WO | 2018/146889 | A1 | 8/2018 |
| WO | 2019/230758 | A1 | 12/2019 |
| WO | 2022/097576 | A1 | 5/2022 |
| WO | 2022/168565 | A1 | 8/2022 |

OTHER PUBLICATIONS

Office Action dated Sep. 17, 2025, corresponding to U.S. Appl. No. 18/134,801.

International Search Report and Written Opinion dated Mar. 28, 2023 corresponding to International Patent Application No. PCT/JP2023/004144.

International Search Report and Written Opinion dated Mar. 15, 2022 corresponding to International Patent Application No. PCT/JP2022/001073.

International Search Report and Written Opinion dated Jan. 11, 2022 corresponding to International Patent Application No. PCT/JP2021/040016.

* cited by examiner

OPTICAL ELEMENT PROVIDED WITH ANTIREFLECTION FILM

CROSS REFERENCE TO RELATED APPLICATION

This is a Continuation of International Patent Application No. PCT/JP2023/004144 filed Feb. 8, 2023, which designates the U.S., and which claims priority from U.S. Provisional Patent Application No. 63/335,891 filed on Apr. 28, 2022 and U.S. Provisional Patent Application No. 63/392,675 filed on Jul. 27, 2022. The contents of these applications are hereby incorporated by reference.

TECHNICAL FIELD

The present invention relates to an optical element provided with an antireflection film.

BACKGROUND ART

Recently a need for a wide-angle detection has been growing. By way of example, in infrared measurement, a light source for a wide-angle illumination is required for a wide-angle detection. Further, in general, light receiving elements used for detection have a relatively low sensitivity at a relatively great angle and therefore in many cases a light source in which the intensity of light at a relatively great angle is heightened is required. In an optical element used together with alight source, however, in general, reflectance for a ray of light at a relatively great angle is relatively high because of Fresnel reflection and therefore the efficiency is reduced. Further, in general, in the shape of a lens for a wide-angle illumination the sag is great and the paraxial radius of curvature is small and therefore difficulties in the production of a mold and the production of a lens through injection molding are enhanced.

On the other hand, in projecting optical systems, imaging optical systems and the like, optical elements provided with an antireflection film on a surface thereof in order to reduce a ratio of light reflected on the surface thereof, have been used (Patent document 1, for example).

However, an optical element that is used for rays of light in a wide-angle range, the angle range being 150 degrees or greater, is capable of making intensity of rays of light at a relatively great angle in the angle range sufficiently great and can be produced with comparative ease has not been developed.

Accordingly, there is a need for an optical element that is used for rays of light in a wide-angle range, the angle range being 150 degrees or greater, is capable of making intensity of rays of light at a relatively great angle in the angle range sufficiently great and can be produced with comparative ease.

PRIOR ART DOCUMENTS

Patent Documents

Patent document 1: WO2019/230758A1

The problem to be solved by the invention is to provide an optical element that is used for rays of light in a wide-angle range, the angle range being 150 degrees or greater, is capable of making intensity of rays of light at a relatively great angle in the angle range sufficiently great and can be produced with comparative ease.

SUMMARY OF INVENTION

In a combination of an optical element and an antireflection film according to a first aspect of the present invention, the optical element is provided with a microlens array on a first surface and is configured so as to receive a light beam through the first surface, the light beam being parallel to a reference axis parallel to the central axis of each microlens, and to make the light beam go out through a second surface while diverging the light beam such that the maximum value of an angle that a diverged ray of light and the reference axis form in a plane containing the reference axis is D, wherein each microlens is configured such that $$Z/P \geq 0.8$$

is satisfied, where Z represents distance between the vertex and the bottom and P represents the diameter of the smallest circle enclosing the bottom and the antireflection film is designed such that $$\{T(0)/T(D)\}/\{T'(0)/T'(D)\} \leq 0.85$$

is satisfied, where T(0) represents transmittance of the film formed on a substrate made of the same material as that of the optical element for an incident ray at the angle of incidence of 0, T(D) represents transmittance of the film formed on the substrate for an incident ray at the angle of incidence of D, T'(0) represents transmittance of the substrate without an antireflection film for an incident ray at the angle of incidence of 0 and T'(D) represents transmittance of the substrate without an antireflection film for an incident ray at the angle of incidence of D. The antireflection film is provided on the second surface so as to realize a target intensity distribution of diverged rays, the distribution being a function of angle with respect to the reference axis. An area of a minute portion of the surface of each microlens, on which an angle of incidence of a ray that travels in the direction parallel to the reference axis is θ, is determined associated with transmittance of the optical element and the antireflection film for the ray that has passed through the minute portion and a target intensity of the ray that has been diverged.

An optical element according to a second aspect of the present invention is provided with a microlens array on a first surface and an antireflection film on a second surface and is configured so as to receive a light beam through the first surface, the light beam being parallel to the central axis of each microlens, and to make the light beam go out through the second surface while diverging the light beam in such a way that the maximum value of an angle that a diverged ray of light forms with the central axis is D, wherein each microlens is configured such that $$Z/P \geq 0.8$$

is satisfied, where Z represents distance between the vertex and the bottom and P represents the diameter of the smallest circle enclosing the bottom, wherein the antireflection film is formed such that $$\{T(0)/T(D)\}/\{T'(0)/T'(D)\} \leq 0.85$$

is satisfied, where T(0) represents transmittance for an incident ray at the angle of incidence of 0 is, T(D) represents transmittance for an incident ray at the angle of incidence of D, T'(0) represents transmittance of the optical element proper without an antireflection film for an incident ray at the angle of incidence of 0 and T'(D) represents transmittance of the optical element proper without an antireflection film for an incident ray at the angle of incidence of D, and wherein $$\left\{\frac{T(0)}{T(D)}\right\}\Big/\left\{\frac{T'(0)}{T'(D)}\right\} \leq Z/P$$

is further satisfied.

When attempts are made to make the intensity of rays of the outgoing beam at relatively great angles with respect to the reference axis greater than the intensity of the ray of the outgoing beam in the reference axis in an optical element that is provided with a microlens array on a first surface and an antireflection film on a second surface and is configured so as to receive a light beam through the first surface, the light beam being parallel to the central axis of each microlens, and to make the light beam go out through the second surface while diverging the light beam, a large portion of rays of the outgoing beam at relatively great angles with respect to the reference axis is reflected on the surfaces of the optical element and therefore the ratio of the beam that has passed through the exit surface (light-delivering surface) of the optical element to the beam that reaches the entrance surface (light-receiving surface) of the optical element, that is, the efficiency is reduced. Further, the curvature of each microlens has to be made relatively great and therefore difficulties in the production of a mold for producing the optical element are enhanced.

According to the present invention, the problem described above is solved by properties of an antireflection film provided on the second surface. In order to make the intensity of rays of the outgoing beam at relatively great angles with respect to the reference axis greater than the intensity of ray of the outgoing beam in the reference axis in the optical element, it is supposed that a ratio of transmittance of the surface provided with the antireflection film for a ray at the angle of D to transmittance of the surface provided with the antireflection film for a ray at the angle of 0 should preferably be made as great as possible. Accordingly, an antireflection film that makes the ratio of transmittance of the surface provided with the antireflection film for a ray at the angle of D to transmittance of the surface provided with the antireflection film for a ray at the angle of 0 as great as possible is formed on the second surface. The problem to be solved by the invention is solved by an antireflection film that is formed such that $$\{T(0)/T(D)\}/\{T'(0)/T'(D)\} \leq 0.85$$

is satisfied when the surface provided with the antireflection film and the surface without an antireflection film is compared with each other.

In the optical element according to a first embodiment of the present invention, D is 75 degrees or greater.

In the optical element according to a second embodiment of the present invention, D is 80 degrees or greater.

In the optical element according to a third embodiment of the present invention, D is 85 degrees or greater.

In the optical element according to a fourth embodiment of the present invention, the antireflection film consists of a single layer made of a material the refractive index of which is lower than the refractive index of a material of the optical element proper.

In the optical element according to a fifth embodiment of the present invention, the antireflection film includes one or more layers with a relatively low index and one or more layers with a relatively higher index, a layer with a relatively low index and a layer with a relatively higher index being formed on top of another, and the outmost layer is a layer with a relatively low index.

In the optical element according to a sixth embodiment of the present invention, the antireflection film is formed such that Rs (D)<Rp(D) is satisfied where Rs (D) represents reflectance for an incident s-polarized light at the angle of D and Rp (D) represents reflectance for an incident p-polarized light at the angle of D.

When the antireflection film provided with the above-described features is formed, $$\{T(0)/T(D)\}/\{T'(0)/T'(D)\} \leq 0.80$$

is easily satisfied when the angle D is 80 degrees or greater and $$\{T(0)/T(D)\}/\{T'(0)/T'(D)\} \leq 0.85$$

is easily satisfied when the angle D is 75 degrees or greater.

In the optical element according to a seventh embodiment of the present invention, the antireflection film is formed such that $$R(0) \geq R'(0)$$

is satisfied where R(0) represents reflectance of the antireflection film for an incident ray at the angle of 0 and R'(0) represents reflectance of the optical element proper without an antireflection film at the angle of 0.

When the antireflection film provided with the above-described features is formed, $$\{T(0)/T(D)\}/\{T'(0)/T'(D)\} \leq 0.80$$

is easily satisfied when the angle D is 80 degrees or greater and $$\{T(0)/T(D)\}/\{T'(0)/T'(D)\} \leq 0.85$$

is easily satisfied when the angle D is 75 degrees or greater. When the efficiency of transmitted light is considered, it is preferable that R (0)<0.2 is satisfied.

In a method of producing an optical element provided with a microlens array on a first surface and an antireflection film on a second surface according to a third aspect of the present invention, the optical element is configured so as to receive a light beam through the first surface, the light beam being parallel to a reference axis parallel to the central axis of each microlens, and to make the light beam go out through the second surface while diverging the light beam such that the maximum value of an angle that a diverged ray of light and the reference axis form in a plane containing the reference axis is D, wherein each microlens is configured such that $$Z/P \geq 0.8$$

is satisfied, where Z represents distance between the vertex and the bottom and P represents the diameter of the smallest circle enclosing the bottom. The method includes designing an antireflection film such that $$\{T(0)/T(D)\}/\{T'(0)/T'(D)\} \leq 0.85$$

is satisfied, where T(0) represents transmittance of the film formed on a substrate made of the same material as that of the optical element for an incident ray at the angle of incidence of 0, T(D) represents transmittance of the film formed on the substrate for an incident ray at the angle of incidence of D, T'(0) represents transmittance of the substrate without an antireflection film for an incident ray at the angle of incidence of 0 and T'(D) represents transmittance of the substrate without an antireflection film for an incident ray at the angle of incidence of D, obtaining transmittance of the optical element and the antireflection film for a ray that travels in the direction parallel to the reference axis, enters the microlens, the angle of incidence being θ, and passes through the optical element and the antireflection film, obtaining a target intensity on the surface of each microlens of the ray with the angle of incidence of θ, using the transmittance of the optical element and the antireflection film for the ray with the angle of incidence of θ and a target intensity distribution of diverged rays, the distribution being a function of angle with respect to the reference axis, and determining the shape of the surface of each microlens by determining an area of a minute portion of the surface of each microlens, on which an angle of incidence of a ray that travels in the direction parallel to the reference axis is θ, such that the target intensity on the surface of each microlens of the ray with the angle of incidence of θ is realized.

DESCRIPTION OF EMBODIMENTS

Figure 1:
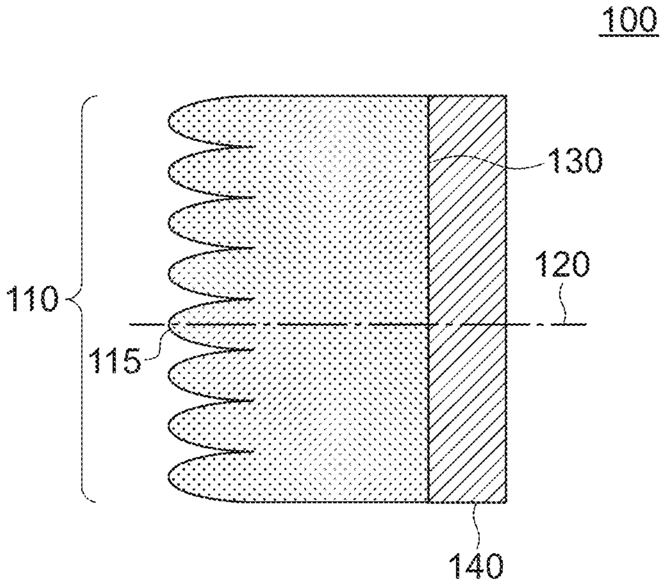
FIG. 1 shows an optical element according to an embodiment of the present invention.

FIG. 1 shows an optical element 100 according to an embodiment of the present invention. On one side of the optical element 100 a microlens array 110 is provided. The microlens array 110 includes plural microlenses 115 that are identical in the shape. The shape of the curved surface of a microlens 115 is axially symmetric around a central axis 120 passing through the vertex. The central axes of the curved surfaces of the plural microlenses 115 are parallel to one another. The microlens array 110 is configured such that a collimated beam that travels in the direction of the central axes 120 and enters the optical element 100 through the surfaces on the above-described one side is diverged. In the description given below, it is assumed that a surface 130 is a flat surface that is perpendicular to the central axes 120. In general, the surface 130 can be a curved surface, the shape of which is axially symmetric around another central axis that is parallel to the central axes 120, for example. The surface 130 is provided with an antireflection film 140. The function of the antireflection film 140 will be described in detail later.

In general, a microlens array used for divergence is configured such that a collimated beam in the direction of the central axes of the curved surfaces of the microlenses is diverged with an angle of divergence with respect to the central axes. A single lens used for divergence is configured such that a collimated beam in the direction of the optical axis is diverged with an angle of divergence with respect to the optical axis. An axis with respect to which an angle of divergence is determined, such as the central axis of the curved surface of a microlens and the optical axis of a single lens, is referred to a reference axis of divergence or merely a reference axis in the description and claims of the present application. The reference axis of the optical element 100 shown in FIG. 1 is the straight line that is parallel to the central axes 120 and passes through the center of a surface on which the microlens array 110 is provided. The maximum value of an angle that the reference axis and a diverged ray of light form is represented by D. In this case, the angle range of rays for the optical element 100 is 2D.

Figure 2:
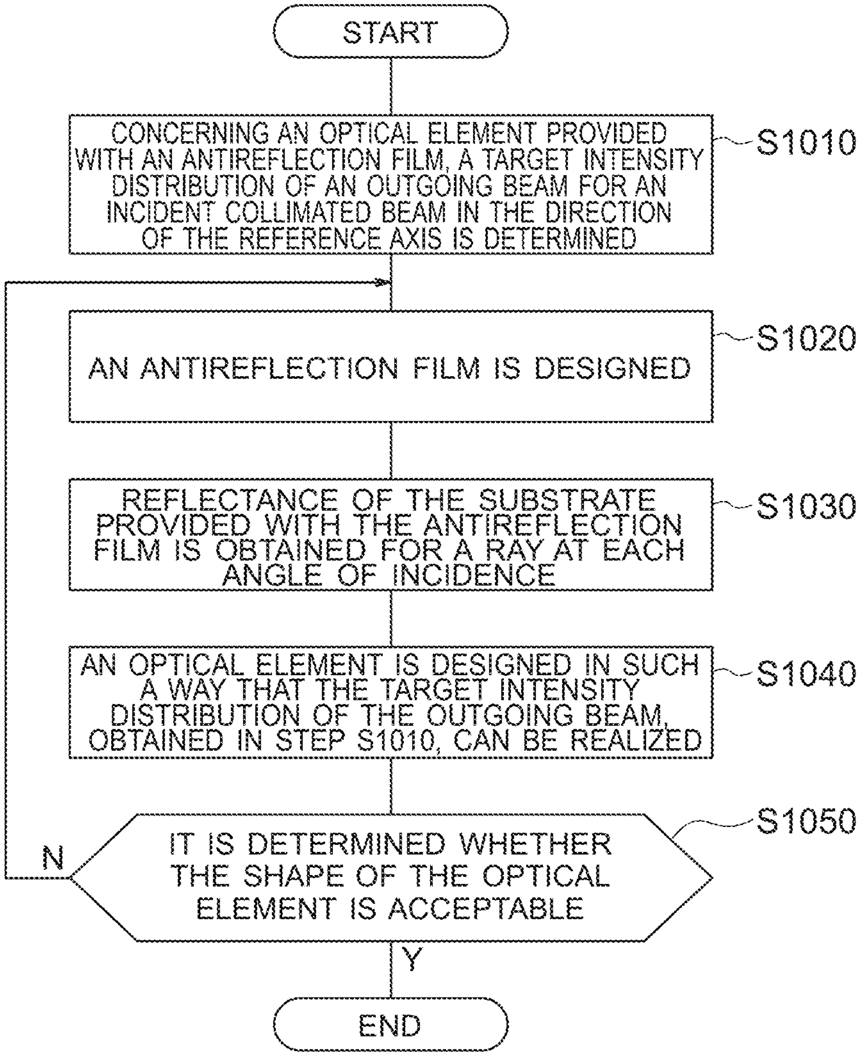
FIG. 2 is a flowchart for describing how to design the optical element.

FIG. 2 is a flowchart for describing how to design the optical element 100.

In step S1010 of FIG. 2, concerning an optical element 100 provided with an antireflection film, a target intensity distribution of an outgoing beam for an incident collimated beam in the direction of the reference axis is determined.

Figure 3:
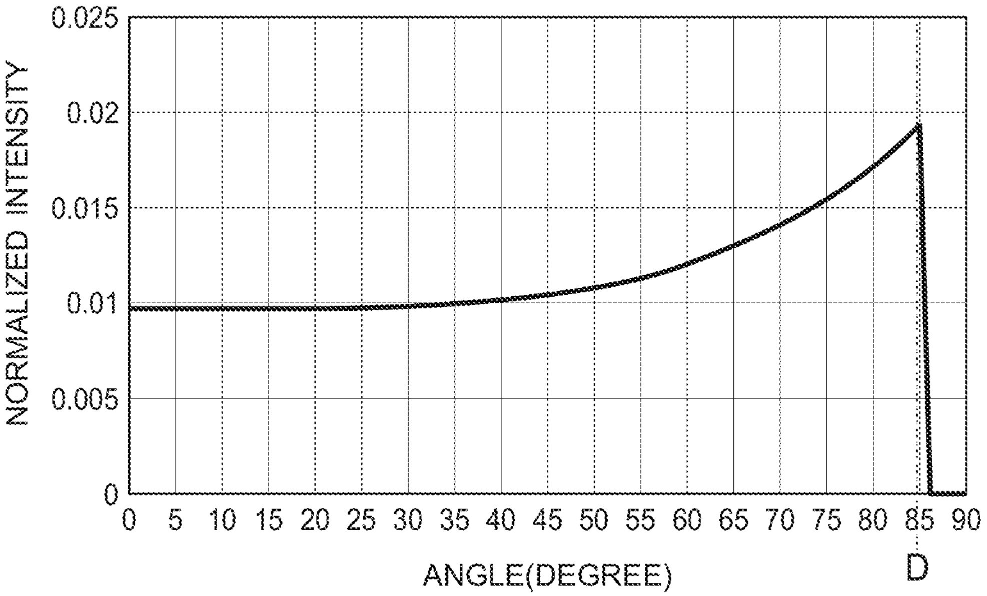
FIG. 3 shows an example of a target intensity distribution of the outgoing beam of the optical element.

FIG. 3 shows an example of a target intensity distribution of the outgoing beam of the optical element 100. The horizontal axis of FIG. 3 indicates angle that a ray of the outgoing beam forms with the reference axis. The unit of angle is degree. The vertical axis of FIG. 3 indicates intensity of rays. The intensity of rays is normalized such that an integrated value of the intensity of rays from 0 degree to 90 degrees is 1. In some wide-angle optical elements, there is a need to make the intensity of an outgoing ray at a relatively great angle greater than the intensity of the outgoing ray in the direction of the reference axis. According to FIG. 3, the intensity of rays has the maximum value at the angle of D and the intensity at the angle of D is twice as great as the intensity at the angle of 0.

When making attempts to design an optical element with which such a target intensity distribution of the outgoing beam as shown in FIG. 3 is realized, the following problems arise. First, concerning rays of the beam, a large portion of rays at relatively great angles with respect to the reference axis is reflected by the surfaces of the optical element, and the ratio of the beam that passes through the exit surface of the optical element to the beam that reaches the entrance surface of the optical element, that is, the efficiency is reduced. Second, in order to realize such a target intensity distribution of the outgoing beam as shown in FIG. 3, the curvature of each microlens has to be increased, for example, which aggravates difficulty in the production of a mold for producing the optical element. The curvature of each microlens will be described later.

Reflectance of a ray that enters the interface between different materials will be described below. In general, reflectance R of a ray is the mean value of reflectance Rs of the s-polarized light and reflectance Rp of the p-polarized light.

$$R = \frac{R_s + R_p}{2}$$

$$R_s = r_s^2,$$

$$R_p = r_p^2$$

Each of $r_s$ and $r_p$ represents amplitude reflectance of each of s- and p-polarized lights.

An angle of incidence and an angle of refraction at the interface between a material with refractive index of n1 and a material with refractive index of n2 are represented respectively by α and ß, and then the following expressions can be obtained.

$$r_s = \frac{n_1\cos\alpha - n_2\cos\beta}{n_1\cos\alpha + n_2\cos\beta}$$

$$r_p = \frac{n_2\cos\alpha - n_1\cos\beta}{n_2\cos\alpha + n_1\cos\beta}$$

According to the Snell's law, the expression $$n_1 \sin\alpha = n_2 \sin\beta$$

holds. When n1, n2 and α are substituted respectively by n1=1, n2=n and α=θ, and A is defined by the expression $$A = \sqrt{1 - \left(\frac{\sin\theta}{n}\right)^2},$$

the expressions $$r_s = \frac{\cos\theta - nA}{\cos\theta + nA}$$

and $$r_p = \frac{A - n\cos\theta}{A + n\cos\theta}$$

can be obtained. Thus reflectance R can be represented as a function of angle of incidence θ.

Since transmittance T can be expressed using reflectance R, transmittance T is also a function of angle of incidence θ.

$$T = 1 - R$$

Figure 4:
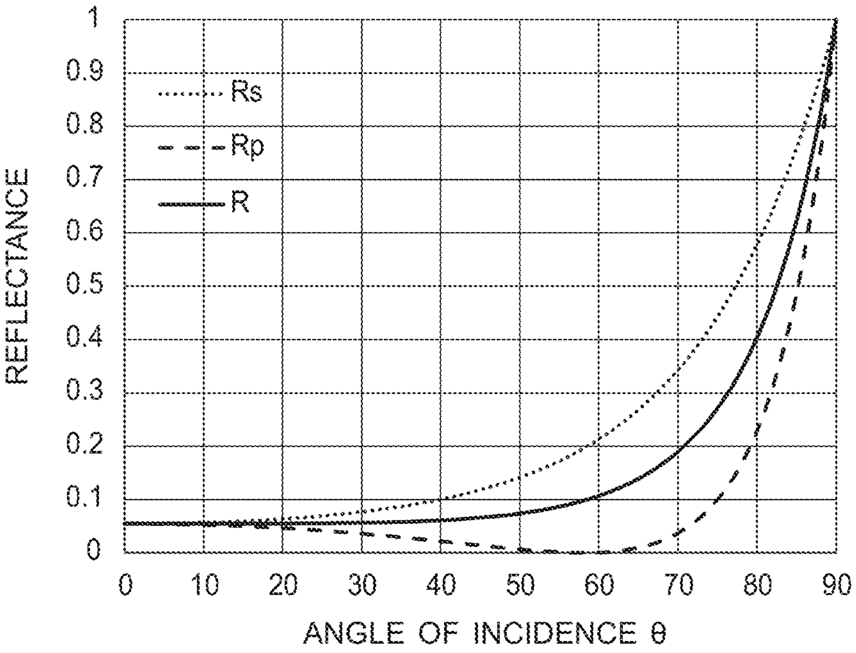
FIG. 4 shows a relationship between angle of incidence of a ray and reflectance in the case that the ray is made to enter a substrate made of the material of the optical element.

FIG. 4 shows a relationship between angle of incidence of a ray and reflectance in the case that the ray is made to enter a substrate made of the same material as that of the optical element 100. The horizontal axis indicates angle of incidence. The unit of angle of incidence is degree. The vertical axis indicates reflectance. Reflectance is represented by a ratio to 1. In FIG. 4 and the following drawings each of which shows a relationship between angle of incidence of a ray and reflectance, the solid line, the dotted line and the broken line represent respectively reflectance R, reflectance Rs of the s-polarized light and reflectance Rp of the p-polarized light. The material of the optical element is polycarbonate and its refractive index at the reference wavelength of 850 nanometers is 1.61. Optical features of the optical elements and antireflection films described in the specification of the present application have been obtained by simulation that uses application programs for optics such as Zemax and Optilayer.

In step S1020 of FIG. 2 an antireflection film is designed and in step S1030 of FIG. 2 reflectance of a substrate provided with an antireflection film is obtained for a ray at each angle of incidence. In order to solve the problems described above, in the present invention an antireflection film that is to be provided on the surface on the other side of the optical element is designed in consideration of such a target intensity distribution of the outgoing beam as shown in FIG. 3. In such a target intensity distribution of the outgoing beam as shown in FIG. 3, the intensity of rays has the maximum value at the angle of D. Accordingly, in order to realize such a target intensity distribution of the outgoing beam as shown in FIG. 3 using the optical element shown in FIG. 1, it seems that a ratio of the transmittance of the surface 130 provided with an antireflection film for a ray with the angle of incidence of D to that for a ray with the angle of incidence of 0 should preferably be sufficiently great. Accordingly, an antireflection film 140 is formed on the surface 130, the antireflection film 140 being designed such that a ratio of the transmittance of the surface 130 provided with the antireflection film for a ray with the angle of incidence of D to that for a ray with the angle of incidence of 0 is sufficiently great.

In general, reflectance of a ray traveling from air to a substrate with an angle of incidence of $\alpha$ on the interface between air and the substrate is equal to reflectance of a ray traveling from the substrate to air with an angle of refraction of $\alpha$ on the interface. Accordingly, a relationship between an angle of incidence and reflectance concerning a ray traveling from air to a substrate is identical with a relationship between an angle of refraction and reflectance concerning a ray traveling from the substrate to air. Concerning an outgoing ray that has traveled in the direction of the reference axis, has entered the optical element 100 shown in FIG. 1 and has passed through the antireflection film 140, the angle of refraction described above is the angle that the outgoing ray and the reference axis form. That is, each of FIG. 4-14 shows a relationship between an angle of incidence and reflectance concerning a ray traveling from air to a substrate provided with an antireflection film and a relationship between an angle of refraction (an angle of an outgoing ray) and reflectance concerning a ray traveling from the substrate to air.

Examples and comparative example of antireflection films will be described below.

Antireflection Films of Example 1 and Comparative Example 1

Each of the antireflection films of Example 1 and Comparative example 1 consists of two layers. The first layer that is on a substrate made of the same material as that of the optical element is a higher refractive index layer made of titanium dioxide and the second layer is a lower refractive index layer made of silicon dioxide. The outmost second layer is a lower refractive index layer. In Examples 1-4, at the reference wavelength of 850 nanometers, the refractive index of the higher refractive index layer made of titanium dioxide is 2.3740 and the refractive index of the lower refractive index layer made of silicon dioxide is 1.4617.

Table 1 shows film thickness of each layer of Example 1 and Comparative example 1. The unit of film thickness is nanometer.

TABLE 1

| | Example 1 | Comparative example 1 |
|---|---|---|
| First layer (TiO2) | 139.0713 | 23.968 |
| Second layer (SiO2) | 164.6969 | 185.363 |

Figure 5:
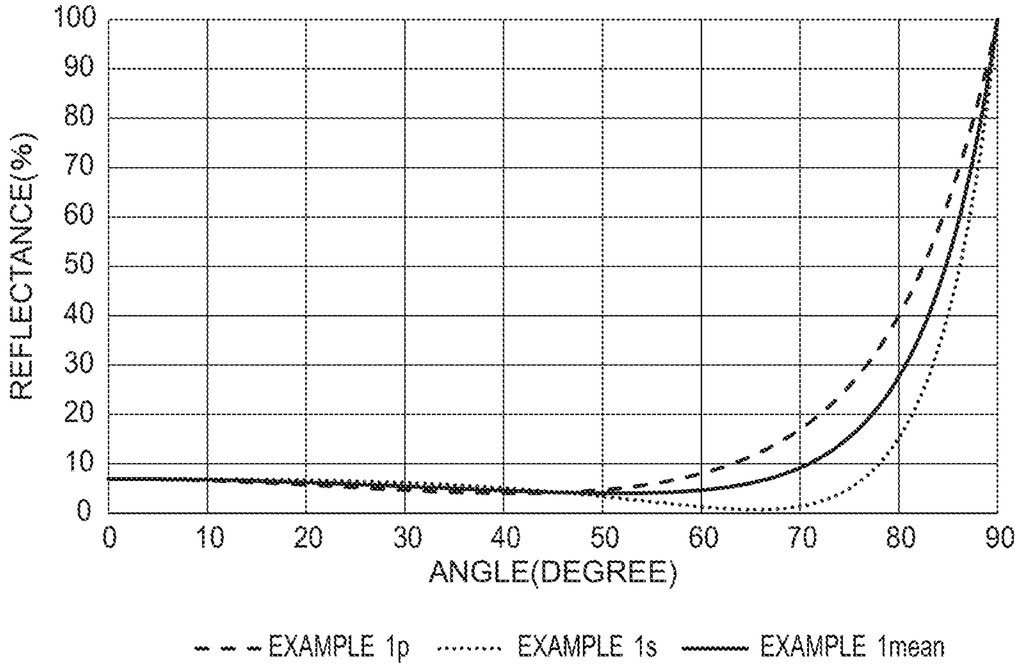
FIG. 5 shows a relationship between angle of incidence of a ray and reflectance in the case that the ray is made to enter a substrate provided with the antireflection film of Example 1.

FIG. 5 shows a relationship between angle of incidence of a ray and reflectance in the case that the ray is incident on a substrate provided with the antireflection film of Example 1. The horizontal axis of FIG. 5 indicates angle of incidence. The unit of angle of incidence is degree. The vertical axis of FIG. 5 indicates reflectance. The unit of reflectance is percent.

Figure 6:
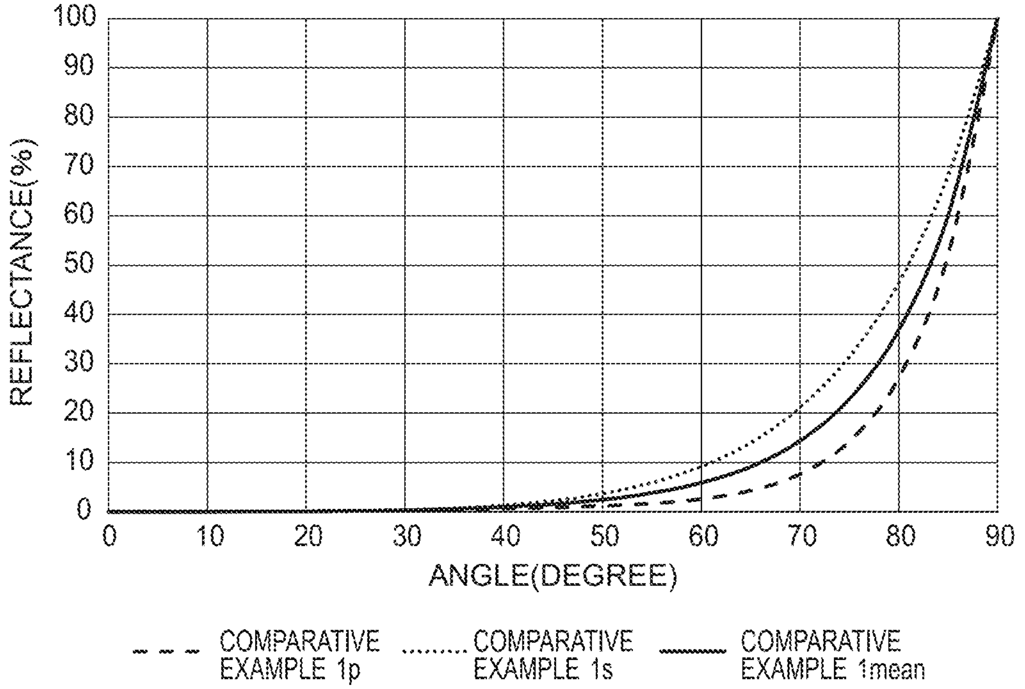
FIG. 6 shows a relationship between angle of incidence of a ray and reflectance in the case that the ray is made to enter a substrate provided with the antireflection film of Comparative example 1.

FIG. 6 shows a relationship between angle of incidence of a ray and reflectance in the case that the ray is made to enter a substrate provided with the antireflection film of Comparative example 1. The horizontal axis of FIG. 6 indicates angle of incidence. The unit of angle of incidence is degree. The vertical axis of FIG. 6 indicates reflectance. The unit of reflectance is percent.

Antireflection Films of Example 2 and Comparative Example 2

Each of the antireflection films of Example 2 and Comparative example 2 consists of three layers. The first layer that is on a substrate made of the same material as that of the optical element is a lower refractive index layer made of silicon dioxide. The second layer is a higher refractive index layer made of titanium dioxide and the third layer is a lower refractive index layer made of silicon dioxide. The outmost third layer is a lower refractive index layer.

Table 2 shows film thickness of each layer of Example 2 and Comparative example 2. The unit of film thickness is nanometer.

TABLE 2

| | Example 2 | Comparative example 2 |
|---|---|---|
| First layer (SiO2) | 210.54 | 10 |
| Second layer (TiO2) | 136.09 | 25.46 |
| Third layer (SiO2) | 159.39 | 185.728 |

Figure 7:
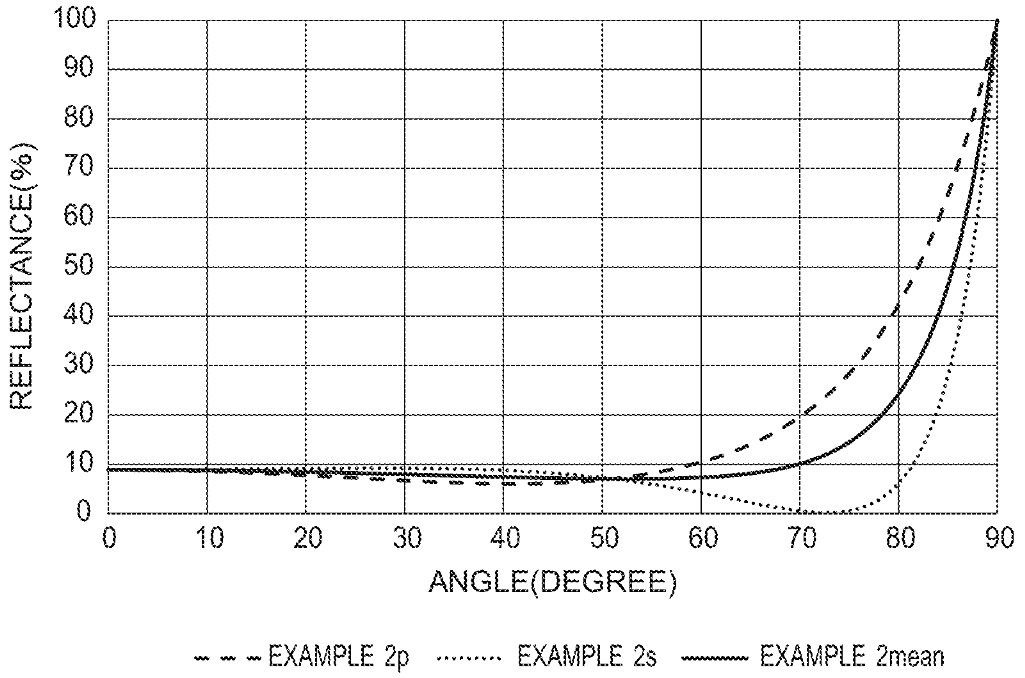
FIG. 7 shows a relationship between angle of incidence of a ray and reflectance in the case that the ray is made to enter a substrate provided with the antireflection film of Example 2.

FIG. 7 shows a relationship between angle of incidence of a ray and reflectance in the case that the ray is made to enter a substrate provided with the antireflection film of Example 2. The horizontal axis of FIG. 7 indicates angle of incidence. The unit of angle of incidence is degree. The vertical axis of FIG. 7 indicates reflectance. The unit of reflectance is percent.

Figure 8:
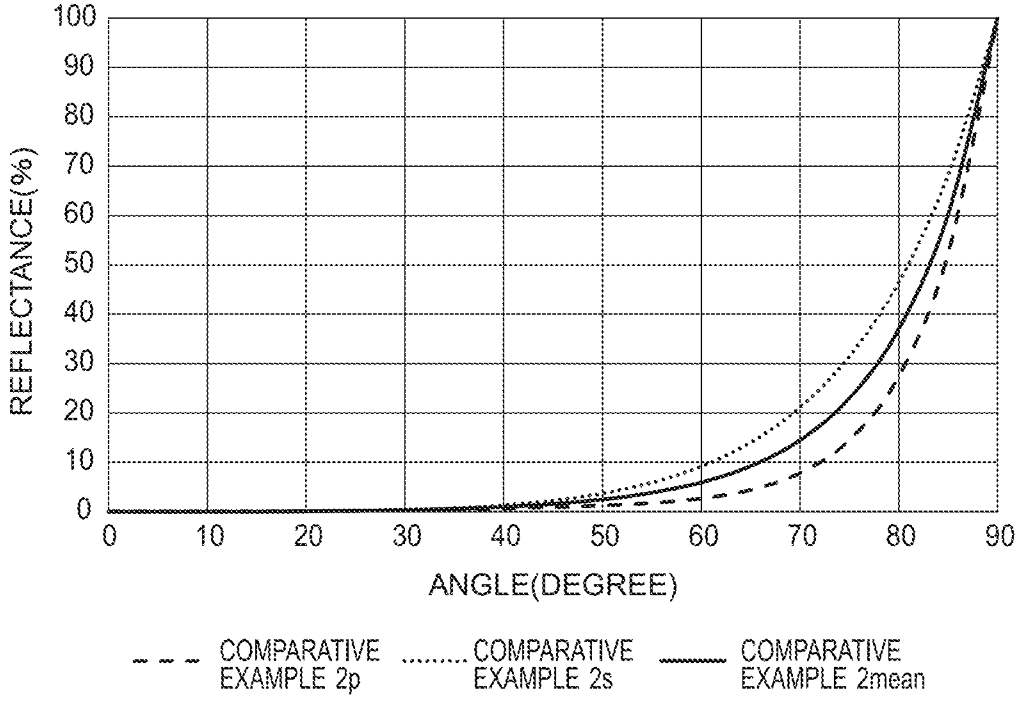
FIG. 8 shows a relationship between angle of incidence of a ray and reflectance in the case that the ray is made to enter a substrate provided with the antireflection film of Comparative example 2.

FIG. 8 shows a relationship between angle of incidence of a ray and reflectance in the case that the ray is incident on a substrate provided with the antireflection film of Comparative example 2. The horizontal axis of FIG. 8 indicates angle of incidence. The unit of angle of incidence is degree. The vertical axis of FIG. 8 indicates reflectance. The unit of reflectance is percent.

Antireflection Films of Example 3 and Comparative Example 3

Each of the antireflection films of Example 3 and Comparative example 3 consists of four layers. The first layer that is on a substrate made of the same material as that of the optical element is a higher refractive index layer made of titanium dioxide. The second layer is a lower refractive index layer made of silicon dioxide, the third layer is a higher refractive index layer made of titanium dioxide and the fourth layer is a lower refractive index layer made of silicon dioxide. The outmost fourth layer is a lower refractive index layer.

Table 3 shows film thickness of each layer of Example 3 and Comparative example 3. The unit of film thickness is nanometer.

TABLE 3

| | Example 3 | Comparative example 3 |
|---|---|---|
| First layer (TiO2) | 300 | 41.294 |
| Second layer (SiO2) | 300 | 37.906 |
| Third layer (TiO2) | 125.62 | 83.459 |
| Fourth layer (SiO2) | 133.72 | 153.556 |

Figure 9:
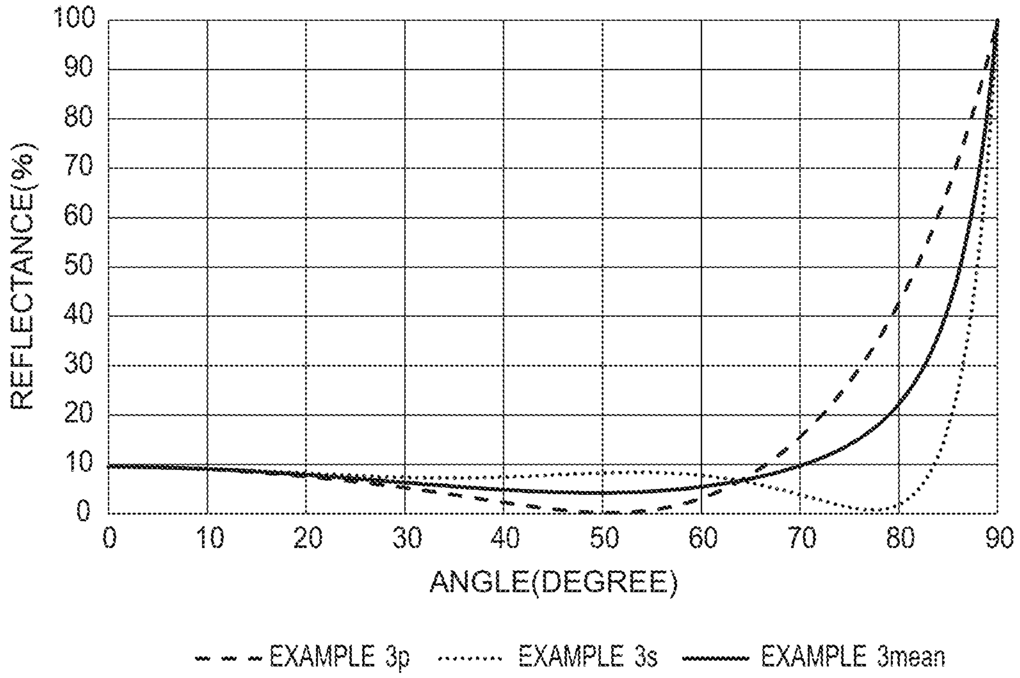
FIG. 9 shows a relationship between angle of incidence of a ray and reflectance in the case that the ray is made to enter a substrate provided with the antireflection film of Example 3.

FIG. 9 shows a relationship between angle of incidence of a ray and reflectance in the case that the ray is made to enter a substrate provided with the antireflection film of Example 3. The horizontal axis of FIG. 9 indicates angle of incidence. The unit of angle of incidence is degree. The vertical axis of FIG. 9 indicates reflectance. The unit of reflectance is percent.

Figure 10:
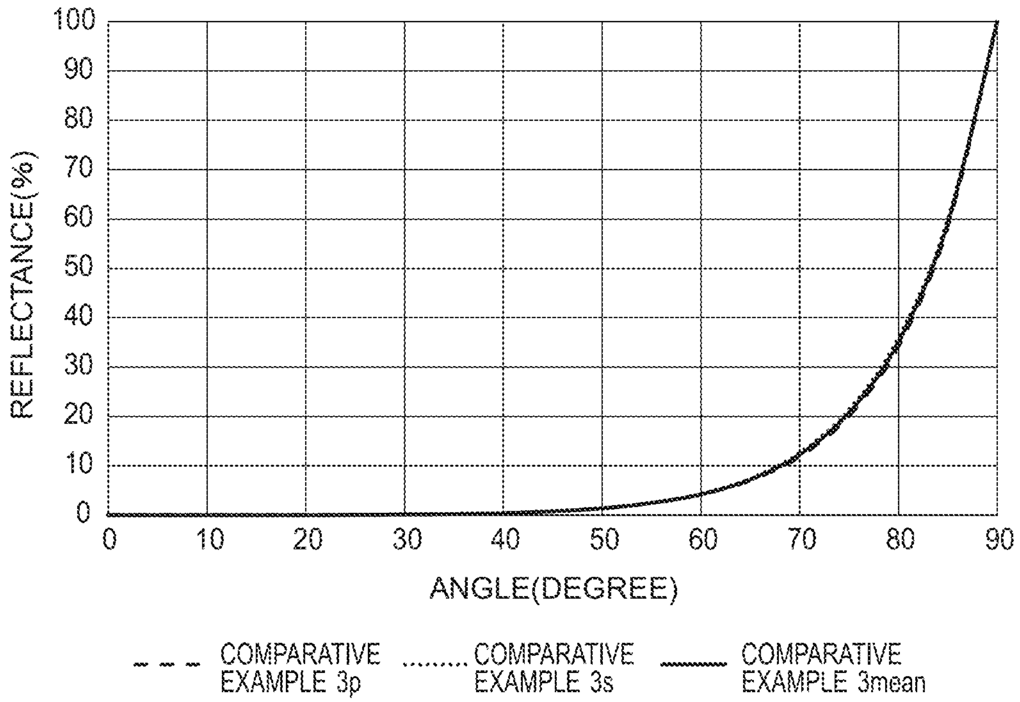
FIG. 10 shows a relationship between angle of incidence of a ray and reflectance in the case that the ray is made to enter a substrate provided with the antireflection film of Comparative example 3.

FIG. 10 shows a relationship between angle of incidence of a ray and reflectance in the case that the ray is incident on a substrate provided with the antireflection film of Comparative example 3. The horizontal axis of FIG. 10 indicates angle of incidence. The unit of angle of incidence is degree. The vertical axis of FIG. 10 indicates reflectance. The unit of reflectance is percent.

Antireflection Films of Example 4 and Comparative Example 4

Each of the antireflection films of Example 4 and Comparative example 4 consists of five layers. The first layer that is on a substrate made of the same material as that of the optical element is a lower refractive index layer made of silicon dioxide. The second layer is a higher refractive index layer made of titanium dioxide, the third layer is a lower refractive index layer made of silicon dioxide, the fourth layer is a higher refractive index layer made of titanium dioxide and the fifth layer is a lower refractive index layer made of silicon dioxide. The outmost fifth layer is a lower refractive index layer.

Table 4 shows film thickness of each layer of Example 4 and Comparative example 4. The unit of film thickness is nanometer.

TABLE 4

| | Example 4 | Comparative example 4 |
|---|---|---|
| First layer (SiO2) | 72.23 | 10 |
| Second layer (TiO2) | 141.05 | 42.515 |
| Third layer (SiO2) | 272.49 | 38.833 |
| Fourth layer (TiO2) | 122.01 | 82.57 |
| Fifth layer (SiO2) | 137.94 | 154.042 |

Figure 11:
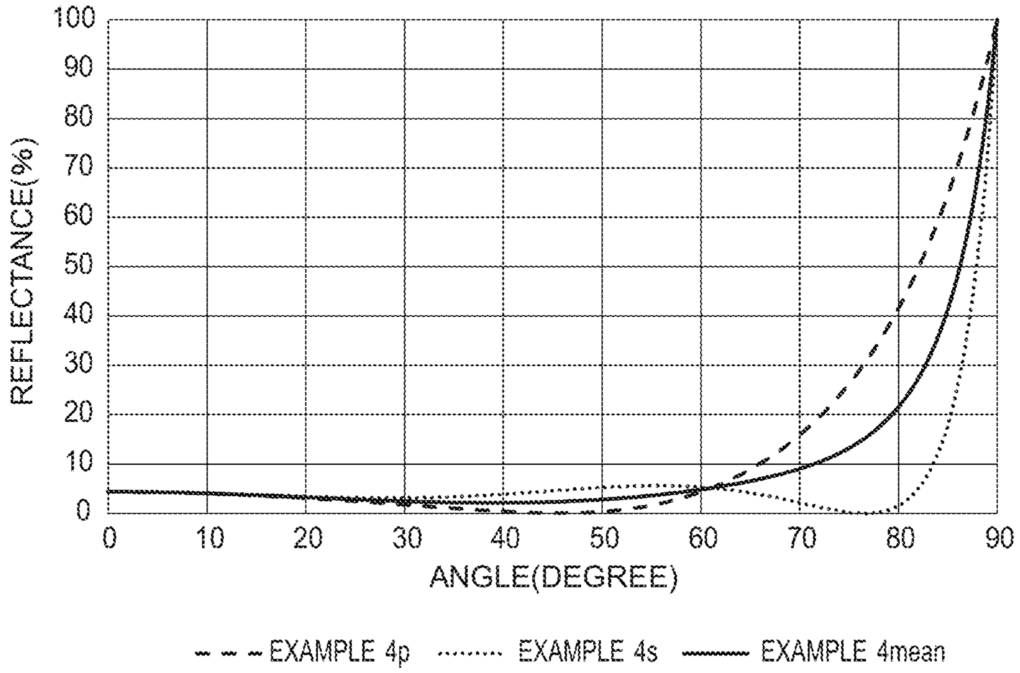
FIG. 11 shows a relationship between angle of incidence of a ray and reflectance in the case that the ray is made to enter a substrate provided with the antireflection film of Example 4.

FIG. 11 shows a relationship between angle of incidence of a ray and reflectance in the case that the ray is incident on a substrate provided with the antireflection film of Example 4. The horizontal axis of FIG. 11 indicates angle of incidence. The unit of angle of incidence is degree. The vertical axis of FIG. 11 indicates reflectance. The unit of reflectance is percent.

Figure 12:
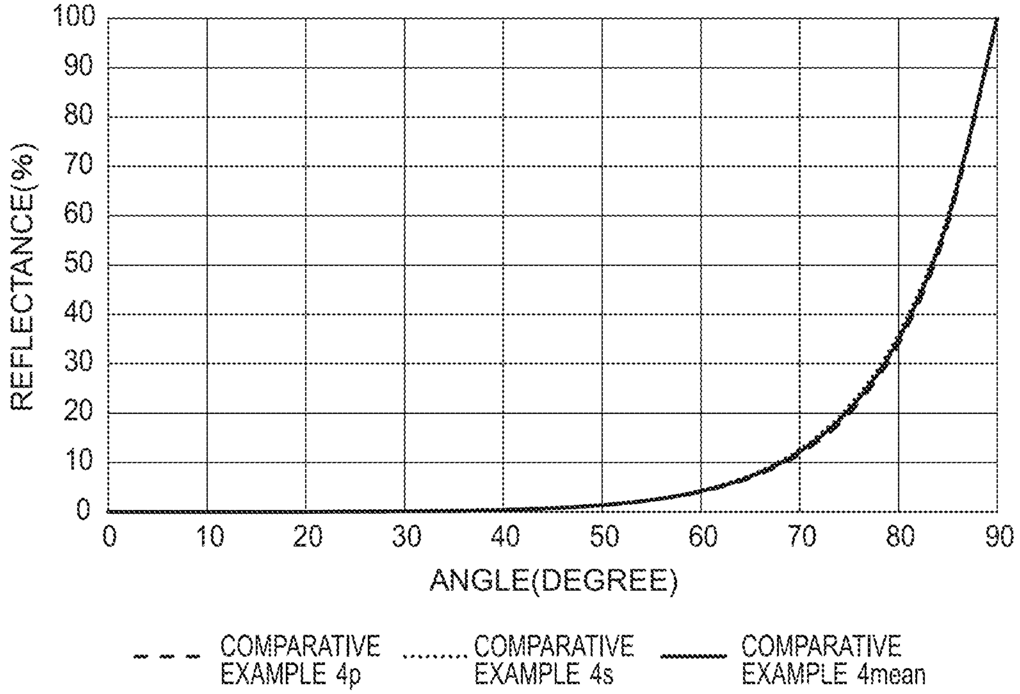
FIG. 12 shows a relationship between angle of incidence of a ray and reflectance in the case that the ray is made to enter a substrate provided with the antireflection film of Comparative example 4.

FIG. 12 shows a relationship between angle of incidence of a ray and reflectance in the case that the ray is made to enter a substrate provided with the antireflection film of Comparative example 4. The horizontal axis of FIG. 12 indicates angle of incidence. The unit of angle of incidence is degree. The vertical axis of FIG. 12 indicates reflectance. The unit of reflectance is percent.

Antireflection Films of Example 5 and Comparative Example 5

Each of the antireflection films of Example 5 and Comparative example 5 consists of a single layer. The single layer made of silicon dioxide is formed on a substrate made of the material of the optical element. At the reference wavelength of 850 nanometers, the refractive index of the single layer is 1.3854. The reason why the refractive index of the lower refractive index layer made of silicon dioxide of Example 5 is lower than the refractive index of the lower refractive index layers made of silicon dioxide of Examples 1-4 is that the film of Example 5 is formed by a method different from those of the other examples.

In the present example the substrate functions as a higher refractive index layer and the single layer functions as a lower refractive index layer.

Table 5 shows film thickness of the single layer of Example 5 and the single layer of Comparative example 5. The unit of film thickness is nanometer.

TABLE 5

| | Example 5 | Comparative example 5 |
|---|---|---|
| Sigle layer (SiO2) | 303.2 | 169.8 |

Figure 13:
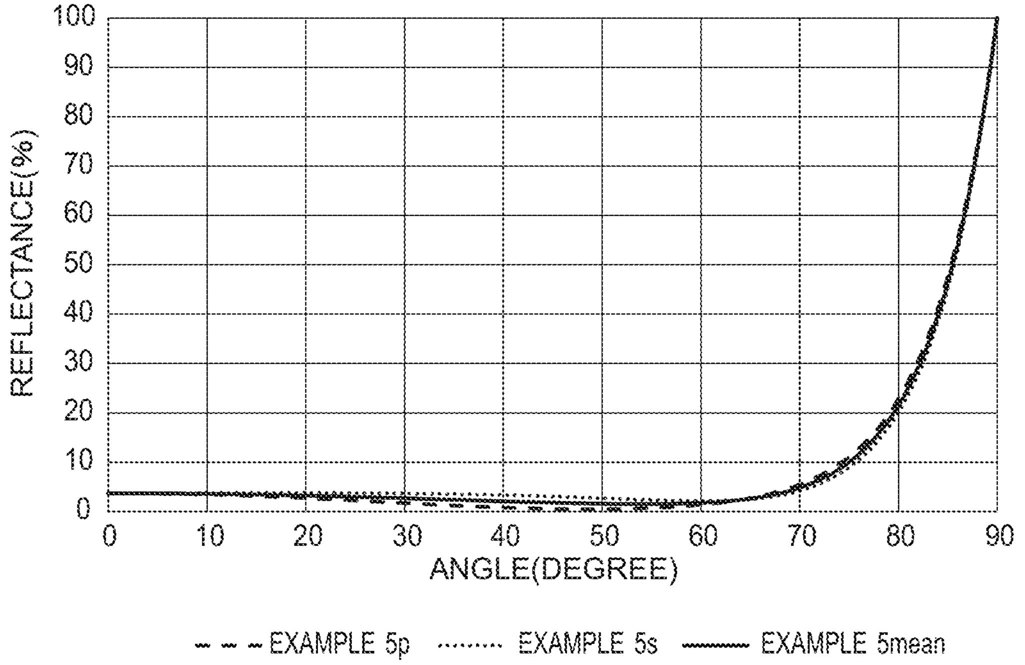
FIG. 13 shows a relationship between angle of incidence of a ray and reflectance in the case that the ray is made to enter a substrate provided with the antireflection film of Example 5.

FIG. 13 shows a relationship between angle of incidence of a ray and reflectance in the case that the ray is incident on a substrate provided with the antireflection film of Example 5. The horizontal axis of FIG. 13 indicates angle of incidence. The unit of angle of incidence is degree. The vertical axis of FIG. 13 indicates reflectance. The unit of reflectance is percent.

Figure 14:
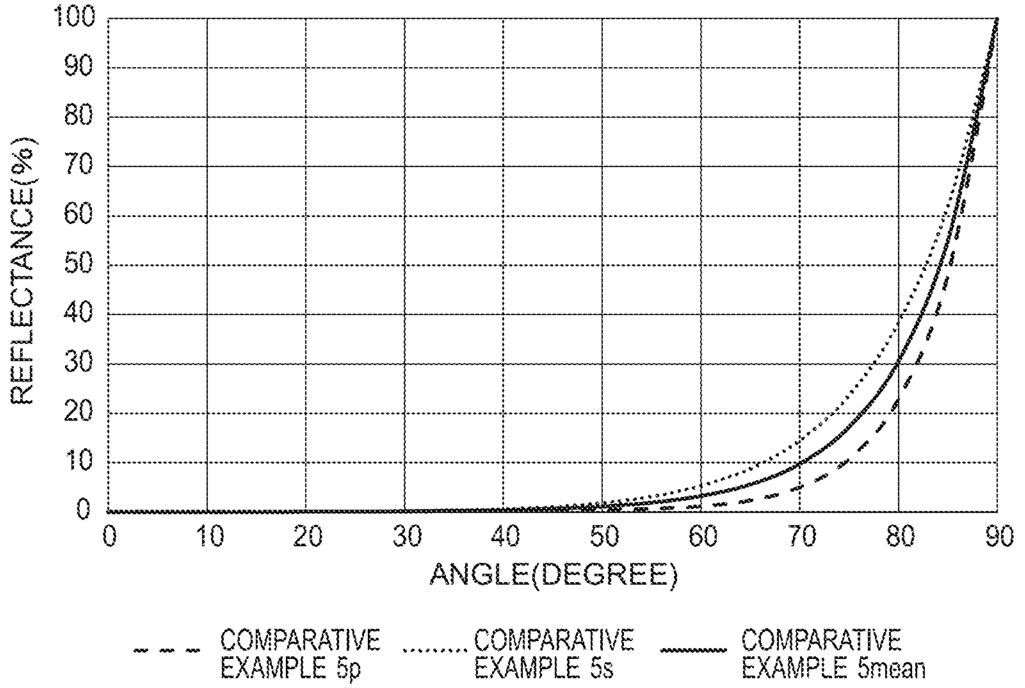
FIG. 14 shows a relationship between angle of incidence of a ray and reflectance in the case that the ray is made to enter a substrate provided with the antireflection film of Comparative example 5.

FIG. 14 shows a relationship between angle of incidence of a ray and reflectance in the case that the ray is incident on a substrate provided with the antireflection film of Comparative example 5. The horizontal axis of FIG. 14 indicates angle of incidence. The unit of angle of incidence is degree. The vertical axis of FIG. 14 indicates reflectance. The unit of reflectance is percent.

Evaluation and Comparison of Performance of the Antireflection Films of the Examples The antireflection films of the examples are designed such that a ratio of transmittance for a ray at the angle D to transmittance for a ray at the angle 0 is relatively great and in other words a ratio of transmittance for a ray at the angle 0 to transmittance for a ray at the angle D is relatively small. Concerning the antireflection films of Examples 1-5, the values of $$T(0)/T(D)$$

and $$[T(0)/T(D)]/[T'(0)/T'(D)]$$

will be evaluated and compared with one another for each of cases in which the angle D is 85 degrees, 80 degrees, 75 degrees and 70 degrees. T(0) and T(D) respectively represent transmittance of a substrate provided with an antireflection film for a ray at the angle 0 and that for a ray at the angle D and T'(0) and T'(D) respectively represent transmittance of the substrate for a ray at the angle 0 and that for a ray at the angle D. As described above a relationship between an angle of incidence and reflectance concerning a ray traveling from air to a substrate is identical with a relationship between an angle of refraction and reflectance concerning a ray traveling from the substrate to air. Further, when a ray travelling in the reference axis is incident onto the optical element shown in FIG. 1, the above-described angle of refraction of the outgoing ray that has passed through the antireflection film is the angle between the reference axis and the outgoing ray. Accordingly, T(0) and T(D) of the substrate provided with the antireflection film of each of the examples and the comparative examples for an outgoing ray that has passed through the antireflection film can be obtained from FIGS. 4-14.

Table 6 shows the values of $$T(0)/T(D)$$

and $$[T(0)/T(D)]/[T'(0)/T'(D)]$$

of the substrate provided with the antireflection film of each of Examples 1-5 and Comparative examples 1-5 when the angle D is 85 degrees.

TABLE 6

| Coating | D | {T(0)/T(D)}/ {T(0)/T(D)} | T(0) | T(D) | T(0)/ T(D) |
|---|---|---|---|---|---|
| Without film | 85 | 100.0% | 94.5% | 37.7% | 250.3% |
| Example 1 | 85 | 76.8% | 93.1% | 48.4% | 192.2% |
| Example 2 | 85 | 67.7% | 91.1% | 53.8% | 169.5% |
| Example 3 | 85 | 61.9% | 90.5% | 58.4% | 154.8% |
| Example 4 | 85 | 65.1% | 95.6% | 58.7% | 163.0% |
| Example 5 | 85 | 71.7% | 96.3% | 53.6% | 179.6% |
| Comparative example1 | 85 | 100.4% | 100.0% | 39.8% | 251.2% |
| Comparative example 2 | 85 | 100.6% | 100.0% | 39.7% | 251.9% |
| Comparative example 3 | 85 | 97.9% | 100.0% | 40.8% | 245.0% |
| Comparative example 4 | 85 | 97.7% | 100.0% | 40.9% | 244.5% |
| Comparative example 5 | 85 | 89.0% | 100.0% | 44.9% | 222.8% |

According to Table 6, the value of 1

$$[T(0)/T(D)]/[T'(0)/T'(D)]$$

of the substrate provided with the antireflection film of each of Examples 2-5 is less than 0.75.

Table 7 shows the values of $$T(0)/T(D)$$

and $$[T(0)/T(D)]/[T'(0)/T'(D)]$$

of the substrate provided with the antireflection film of each of Examples 1-5 and Comparative examples 1-5 when the angle D is 80 degrees.

TABLE 7

| Coating | D | (T(0)/T(D)}/ {T(0)/T(D)} | T(0) | T(D) | T(0)/ T(D) |
|---|---|---|---|---|---|
| Without film | 80 | 100.0% | 94.5% | 59.6% | 158.4% |
| Example 1 | 80 | 81.1% | 93.1% | 72.4% | 128.5% |
| Example 2 | 80 | 75.9% | 91.1% | 75.8% | 120.2% |
| Example 3 | 80 | 73.5% | 90.5% | 77.7% | 116.4% |
| Example 4 | 80 | 76.9% | 95.6% | 78.5% | 121.9% |
| Example 5 | 80 | 77.4% | 96.3% | 78.5% | 122.6% |
| Comparative example1 | 80 | 99.9% | 100.0% | 63.2% | 158.3% |
| Comparative example 2 | 80 | 100.1% | 100.0% | 63.1% | 158.6% |
| Comparative example 3 | 80 | 97.2% | 100.0% | 65.0% | 153.9% |
| Comparative example 4 | 80 | 97.0% | 100.0% | 65.1% | 153.7% |
| Comparative example 5 | 80 | 91.2% | 100.0% | 69.2% | 144.4% |

According to Table 7, the value of $$[T(0)/T(D)]/[T'(0)/T'(D)]$$

of the substrate provided with the antireflection film of each of Examples 1-5 is less than 0.80.

Table 8 shows the values of $$T(0)/T(D)$$

and $$[T(0)/T(D)]/[T'(0)/T'(D)]$$

of the substrate provided with the antireflection film of each of Examples 1-5 and Comparative examples 1-5 when the angle D is 75 degrees.

Table 8

TABLE 8

| Coating | D | {T(0)/T(D)}/ {T(0)/T(D)} | T(0) | T(D) | T(0)/ T(D) |
|---|---|---|---|---|---|
| Without film | 75 | 100.0% | 94.5% | 72.8% | 129.7% |
| Example 1 | 75 | 84.8% | 93.1% | 84.6% | 110.0% |
| Example 2 | 75 | 82.1% | 91.1% | 85.5% | 106.5% |
| Example 3 | 75 | 81.1% | 90.5% | 86.0% | 105.2% |
| Example 4 | 75 | 85.0% | 95.6% | 86.8% | 110.2% |
| Example 5 | 75 | 82.5% | 96.3% | 90.0% | 107.0% |
| Comparative example1 | 75 | 99.9% | 100.0% | 77.2% | 129.6% |
| Comparative example 2 | 75 | 100.0% | 100.0% | 77.1% | 129.8% |
| Comparative example 3 | 75 | 97.2% | 100.0% | 79.3% | 126.1% |
| Comparative example 4 | 75 | 97.1% | 100.0% | 79.4% | 126.0% |
| Comparative example 5 | 75 | 93.2% | 100.0% | 82.7% | 120.9% |

According to Table 8, the value of $$[T(0)/T(D)]/[T'(0)/T'(D)]$$

of the substrate provided with the antireflection film of each of Examples 1-5 is equal to or less than 0.85.

Table 9 shows the values of $$T(0)/T(D)$$

and $$[T(0)/T(D)]/[T'(0)/T'(D)]$$

of the substrate provided with the antireflection film of each of Examples 1-5 and Comparative examples 1-5 when the angle D is 70 degrees.

TABLE 9

| Coating | D | {T(0)/T(D)}/ {T(0)/T(D)} | T(0) | T(D) | T(0)/ T(D) |
|---|---|---|---|---|---|
| Without film | 70 | 100.0% | 94.5% | 80.9% | 116.7% |
| Example 1 | 70 | 87.8% | 93.1% | 90.8% | 102.5% |
| Example 2 | 70 | 86.8% | 91.1% | 89.9% | 101.3% |
| Example 3 | 70 | 85.9% | 90.5% | 90.3% | 100.2% |
| Example 4 | 70 | 90.1% | 95.6% | 91.0% | 105.1% |
| Example 5 | 70 | 86.7% | 96.3% | 95.2% | 101.2% |
| Comparative example1 | 70 | 100.0% | 100.0% | 85.7% | 116.7% |
| Comparative example 2 | 70 | 100.1% | 100.0% | 85.6% | 116.9% |
| Comparative example 3 | 70 | 97.6% | 100.0% | 87.8% | 113.9% |
| Comparative example 4 | 70 | 97.5% | 100.0% | 87.9% | 113.8% |
| Comparative example 5 | 70 | 95.0% | 100.0% | 90.1% | 110.9% |

According to Tables 6-9, the value of $$[T(0)/T(D)]/[T'(0)/T'(D)]$$

of the substrate provided with the antireflection film of each of Examples 1-5 is equal to or less than 0.85 (85%) when the angle D is 85 degrees, 80 degrees and 75 degrees. Further, the value of $$[T(0)/T(D)]/[T'(0)/T'(D)]$$

of the substrate provided with the antireflection film of each of Examples 1-5 is equal to or less than 0.80 (80%) when the angle D is 85 degrees and the value of $$[T(0)/T(D)]/[T'(0)/T'(D)]$$

of the substrate provided with the antireflection film of each of Examples 2-5 is equal to or less than 0.80 (80%) when the angle D is 80 degrees. Further, the value of $$[T(0)/T(D)]/[T'(0)/T'(D)]$$

of the substrate provided with the antireflection film of each of Examples 2-5 is equal to or less than 0.75 (75%) when the angle D is 85 degrees.

According to FIGS. 5, 7, 9, 11 and 13, concerning the substrate provided with the antireflection film of each of Examples 1-5, the following expression holds when the angle D is 85 degrees, 80 degrees, 75 degrees and 70 degrees.

$$R_s(D) < R_p(D)$$

Rs (D) represents reflectance for the s-polarized light at the angle D and Rp (D) represents reflectance for the p-polarized light at the angle D. On the other hand, according to FIGS. 6, 8, 10, 12 and 14, concerning the substrate provided with the antireflection film of each of Comparative examples 1-5, the following expression holds when the angle D is 85 degrees, 80 degrees, 75 degrees and 70 degrees.

$$R_s(D) > R_p(D)$$

According to Tables 6-9, the reflectance of the substrate provided with the antireflection film of each of Examples 1 and 2 for a ray at the incidence angle of 0 is greater than the reflectance of the substrate without an antireflection film for a ray at the incidence angle of 0. On the other hand, according to Tables 6-9, the reflectance of the substrate provided with the antireflection film of each of Comparative examples 1-5 for a ray at the incidence angle of 0 is smaller than the reflectance of the substrate without an antireflection film for a ray at the incidence angle of 0. The antireflection films of Comparative examples are formed so as to reduce the reflectance for the ray at the incidence angle of 0.

In step S1040 of FIG. 2, an optical element 100 is designed in such a way that such a target intensity distribution of the outgoing beam as shown in FIG. 3 can be realized for an incident collimated beam in the direction of the reference axis onto the optical element provided with an antireflection film.

Figure 15:
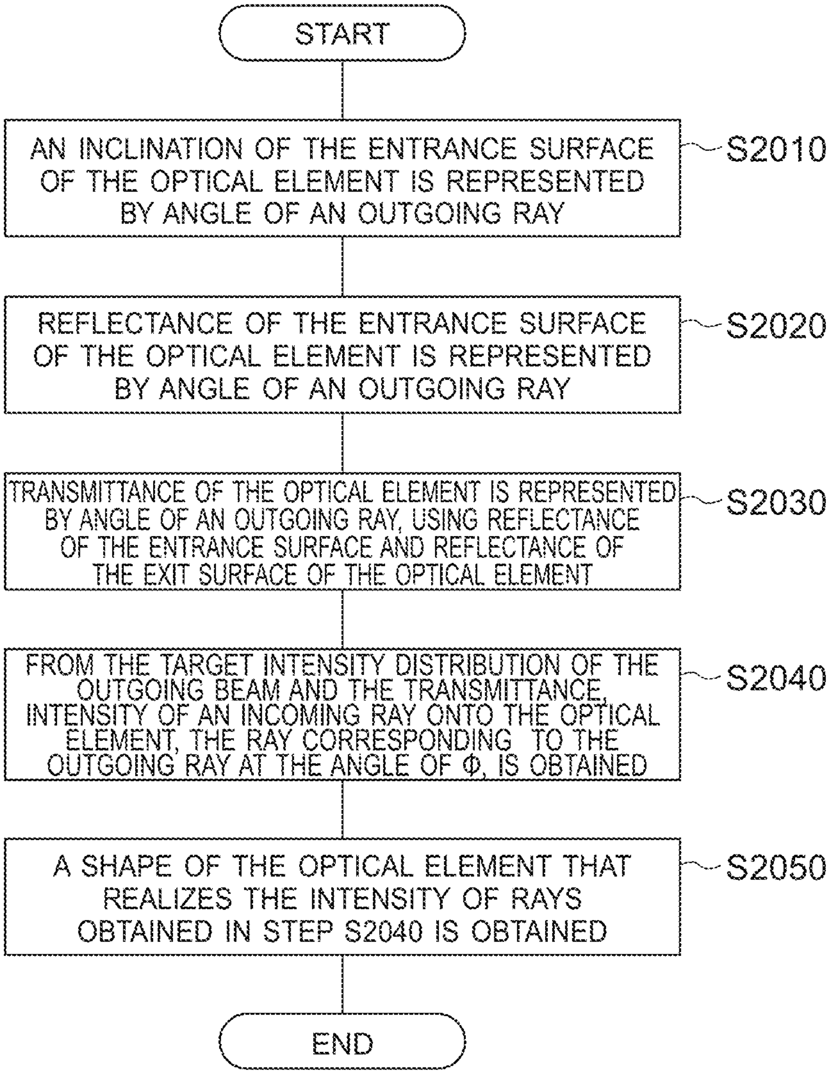
FIG. 15 is a flowchart for describing the step S1040 of FIG. 2.

FIG. 15 is a flowchart for describing the step S1040 of FIG. 2.

In step S2010 of FIG. 15, an inclination of the surface on the light receiving side of the optical element is represented by an angle that an outgoing ray having passed through the optical element forms with the reference axis. In the specification of the present application the above-described angle is referred to an angle of an outgoing ray.

Figure 16:
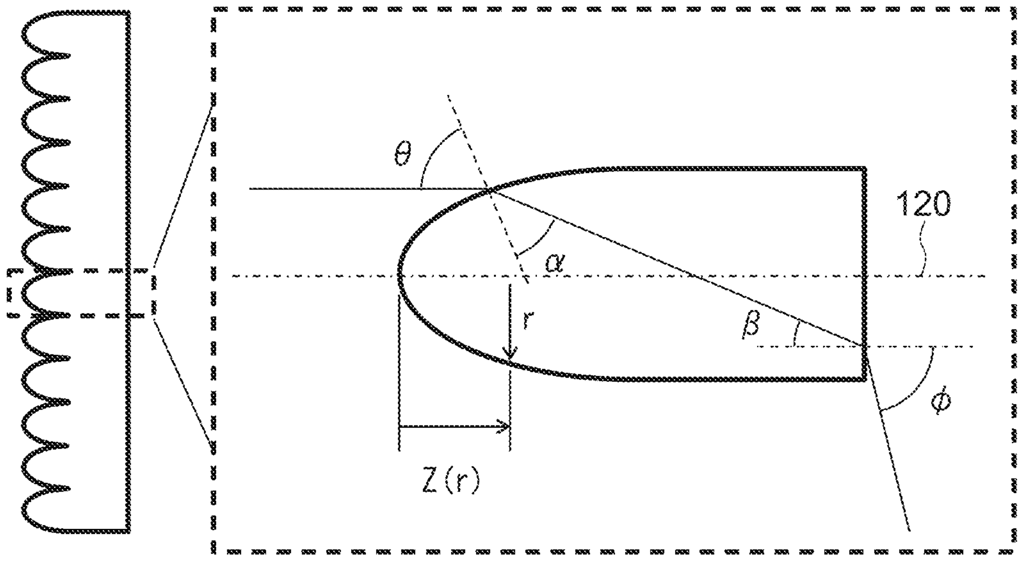
FIG. 16 shows a cross section containing the central axis of a microlens.

FIG. 16 shows a cross section containing the central axis of a microlens. In the above-described cross section, an angle that a ray parallel to the central axis forms with the entrance surface of the microlens, or an angle of incidence of the ray on the entrance surface is represented by θ, an angle of refraction of the ray is represented by α, an angle of incidence of the ray on the exit surface of the optical element is represented by ß and an angle of refraction, that is, an angle of the outgoing ray is represented by ϕ. θ represents an inclination of the entrance surface of the optical element. Since an incident ray and a normal to the exit surface is parallel to each other, the following expression holds.

$$\theta = \alpha + \beta$$

When refractive index of the lens is represented by n, the following expressions hold according to the Snell's law.

$$n \sin \alpha = \sin \theta$$

$$n \sin \beta = \sin \varnothing$$

Using the expressions described above, angle of incidence or inclination θ can be obtained as below.

$$\theta(\phi) = \tan^{-1}\frac{\sin\beta}{n - \cos\beta} + \beta$$

$$\beta = \sin^{-1}\frac{\sin\phi}{n}$$

Thus, inclination θ of the entrance surface of the optical element can be expressed by angle ϕ of an outgoing ray. Further, in FIG. 16, r represents distance between a point on the entrance surface and the central axis 120 of the microlens and z (r) represents sag of the entrance surface of the microlens.

In step S2020 of FIG. 15, reflectance on the entrance surface of the optical element is represented by angle of an outgoing ray. Using inclination θ of the entrance surface, which is represented by angle ϕ of an outgoing ray, reflectance of the entrance surface can be represented by angle ϕ of an outgoing ray.

In step S2030 of FIG. 15, transmittance of the optical element is represented by angle ϕ of an outgoing ray using reflectance on the entrance surface and reflectance on the exit surface of the optical element. Concerning an outgoing ray that has passed through an antireflection film, a relationship between angle ϕ of the outgoing ray and reflectance is available from FIG. 5 and other drawings and therefore transmittance of the optical element provided with an antireflection film can be represented by angle ϕ of the outgoing ray.

Figure 17:
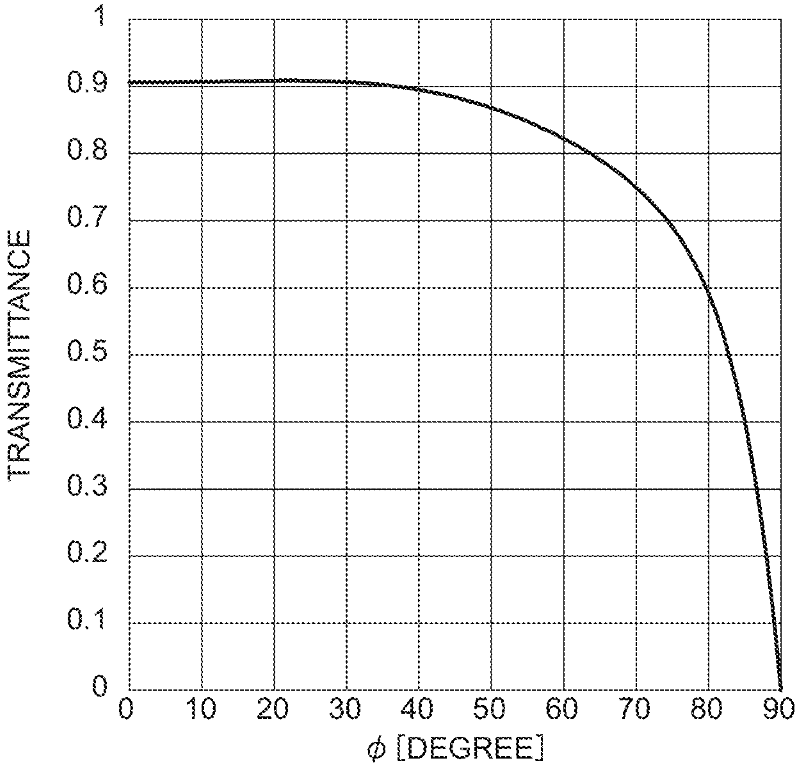
FIG. 17 shows an example of a relationship between angle of an outgoing ray and transmittance of the optical element provided with an antireflection film.

FIG. 17 shows an example of a relationship between angle ϕ of an outgoing ray and transmittance of the optical element provided with an antireflection film. The horizontal angle of FIG. 17 indicates angle ϕ of an outgoing ray. The unit of angle is degree. The vertical axis of FIG. 17 indicates transmittance.

In step S2040 of FIG. 15, from a target intensity distribution of outgoing rays and transmittance of the optical element, intensity of an incident ray onto the optical element, the incident ray corresponding to the outgoing ray at the angle of ϕ, is obtained.

Figure 18:
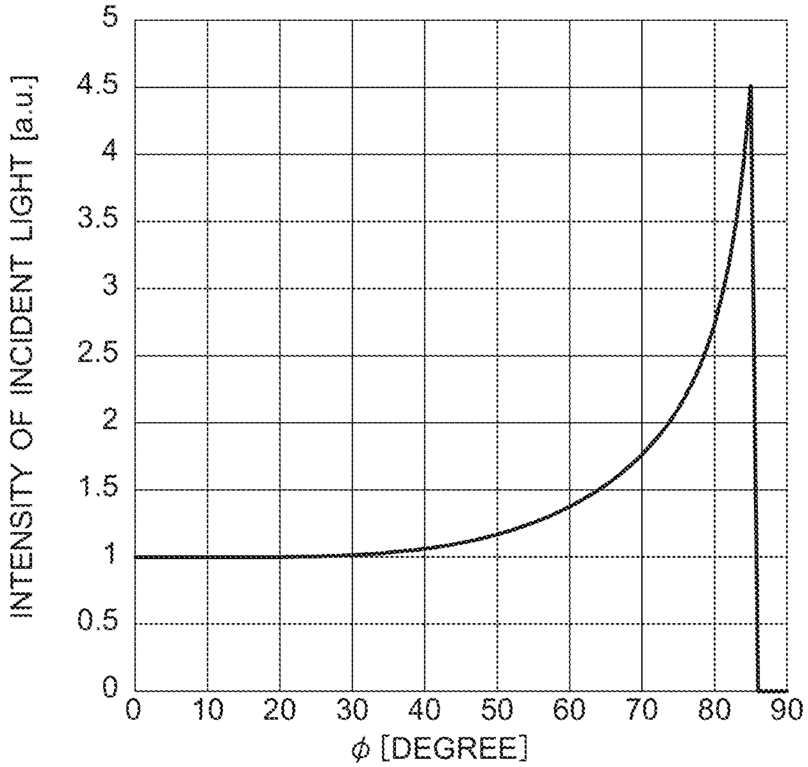
FIG. 18 shown an example of a relationship between angle ϕ of an outgoing ray and intensity of an incoming ray that travels as the outgoing ray at the angle ϕ.

FIG. 18 shown an example of a relationship between angle ϕ of an outgoing ray and intensity of an incoming ray that travels as the outgoing ray at the angle ϕ. The horizontal angle of FIG. 18 indicates angle ϕ of an outgoing ray. The unit of angle is degree. The vertical axis of FIG. 18 indicates intensity of light. Intensity is represented as relative values.

In step S2050 of FIG. 15, a shape of the optical element that realizes the intensity of rays obtained in step S2040 is obtained. It is assumed that an intensity distribution of incoming rays onto the optical element is uniform and the intensity distribution obtained in step S2040 is realized by adjusting an area of a minute portion on the entrance surface, the minute portion being associated with the outgoing ray at the angle of ϕ.

Figure 19:
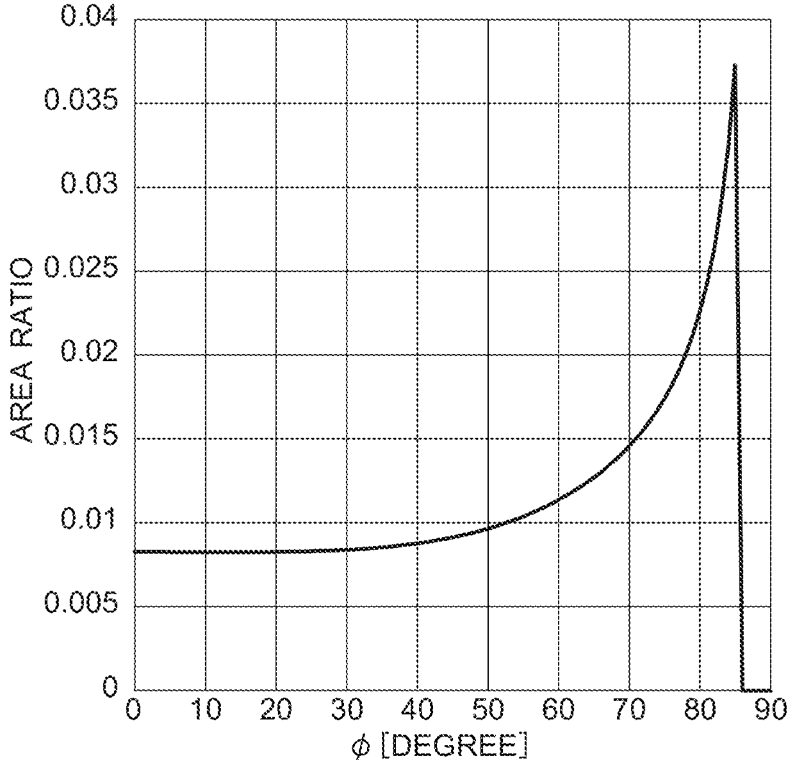
FIG. 19 shown an example of a relationship between angle ϕ of an outgoing ray and area ratio of a minute portion on the entrance surface through which the outgoing ray at the angle of ϕ passes.

FIG. 19 shown an example of a relationship between angle ϕ of an outgoing ray and area ratio of a minute portion on the entrance surface through which the outgoing ray at the angle of ϕ passes. The horizontal angle of FIG. 19 indicates angle ϕ of an outgoing ray. The unit of angle is degree. The vertical axis of FIG. 19 indicates area ratio. The value of integral of area ratio over angle is 1.

Figure 20:
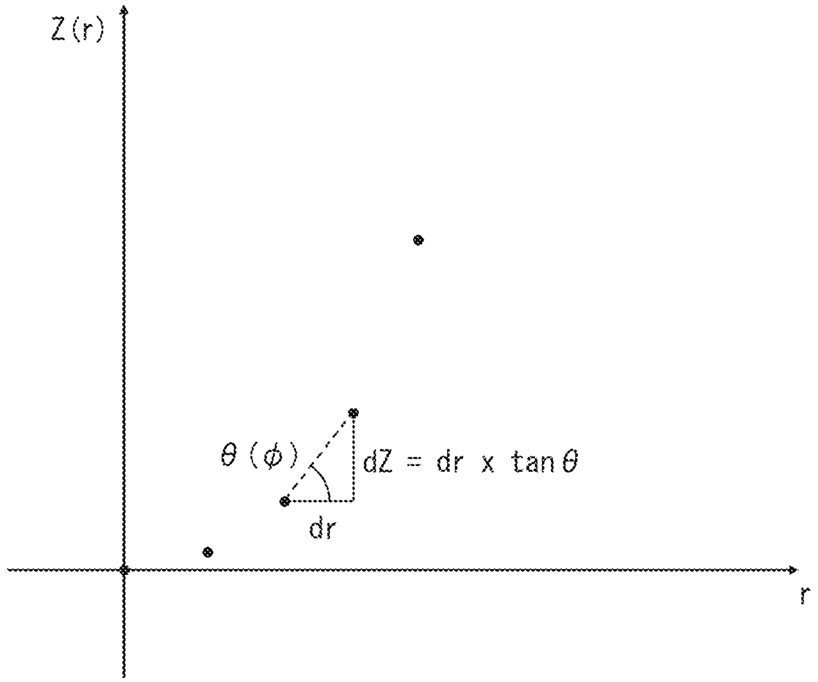
FIG. 20 illustrates a shape of the optical element that realizes the intensity distribution obtained in step S2040.

FIG. 20 illustrates a shape of the optical element that realizes the intensity distribution obtained in step S2040. The horizontal axis of FIG. 20 indicates radial coordinate r. The vertical axis of FIG. 20 indicates sag Z. In FIG. 20 dr represents an area of a minute portion. By changing a size of the minute portion in which an inclination of the entrance surface is represented by θ, the inclination being associated with an angle ϕ of an outgoing ray, the area ratio pattern shown in FIG. 19 is realized.

In step S1050 of FIG. 2, it is determined whether the shape of the optical element is acceptable. If acceptable, the process is terminated. If not acceptable, the process returns to step S1020.

Examples of optical elements designed according to the method of the flowchart shown in FIG. 15 will be described below. Each of the optical elements of the examples is provided with one of the antireflection films of Examples 1-5 and configured such that intensity of the outgoing ray at the angle of D is twice as great as intensity of the outgoing ray at the angle of 0. As angle D of an outgoing ray, one of four values, 85 degrees, 80 degrees, 75 degrees and 70 degrees, is employed and the number of the types of antireflection films of the examples is five. Accordingly, the number of the examples of optical elements provided with an antireflection film is twenty. By way of example, an optical element designed for the angle D of an outgoing ray of 85 degrees and provided with the antireflection film of Example 1 is referred to as an optical element of 85-1 and an optical element designed for the angle D of an outgoing ray of 75 degrees and provided with the antireflection film of Example 5 is referred to as an optical element of 75-5. Further, an optical element designed for the angle D of an outgoing ray of 85 degrees and provided with the antireflection film of Comparative example 1 is referred to as an optical element of 85-1' and an optical element designed for the angle D of an outgoing ray of 75 degrees and provided with the antireflection film of Comparative example 5 is referred to as an optical element of 75-5'. An optical element designed for the angle D of an outgoing ray of 85 degrees and not provided with an antireflection film is referred to as an optical element of 85-0. Some of the twenty examples described above do not have the features claimed in claims and therefore should be referred to as comparative examples.

Concerning the curved surface of each microlens of the microlens array, the origin is located at the vertex of the lens, an x-axis and a y-axis are defined in the plane containing the origin and parallel to the bottom and a z-axis that is orthogonal to the x-axis and the y-axis is defined. The direction of the z-axis is defined as that of a ray travelling along the z-axis.

The curved surface of a microlens and the exit surface of the optical element can be expressed by the following expression.

$$Z = \frac{cr^2}{1 + \sqrt{1 - (1 + k)c^2 r^2}} + \sum a_i r^i \quad (1)$$

c represents the curvature at the vertex of the curved surface and is the inverse number of the radius of curvature. r represents distance between a point on the curved surface and the straight line passing through the vertex of the curved surface, that is, the reference axis. k represents a conic constant and ai represents an aspheric coefficient of order i.

The shape of the bottom of each microlens is a regular hexagon and microlenses, each having a regular hexagonal bottom, are arranged on a plane closely leaving no space therebetween to form a microlens array.

Figure 21:
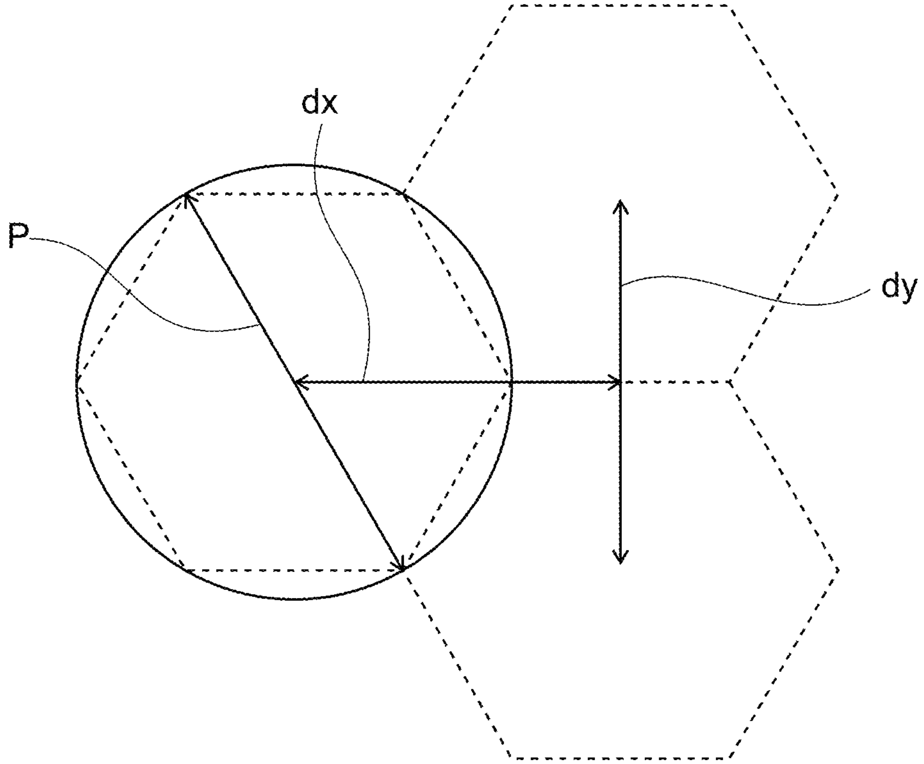
FIG. 21 shows an arrangement of regular hexagonal bottoms of microlenses of one of the examples.

FIG. 21 shows an arrangement of regular hexagonal bottoms of microlenses of one of the examples. In FIG. 21, distance dx that is a distance in the x-axis direction between the centers of adjacent regular hexagonal bottoms is 0.225 millimeters and distance dy that is a distance in the y-axis direction between the centers of adjacent regular hexagonal bottoms is 0.260 millimeters. A length of a diagonal passing through the center of a regular hexagon is 0.3 millimeters. Length P represents the diameter of the circumcircle of the regular hexagon described above, that is, the diameter of the minimum circle enclosing the bottom of a microlens.

Table 10 shows the shape of each microlens of 85-0, 85-1, 85-2, 85-3, 85-4 and 85-5. In the table, "Radius of curvature" and "Curvature" refer to R and c of Expression (1), respectively. "Sag" refers to sag Z when r=P/2=0.15. The value is a distance between the vertex and the bottom of a microlens. "Aspect ratio" refers to Z/P. "Curvature ratio" refers to the ratio of "Curvature" of each example to "Curvature" in the case without an antireflection film.

TABLE 10

| Film | Without film | Example 1 | Example 2 | Example 3 | Example 4 | Example 5 |
|---|---|---|---|---|---|---|
| D | 85 | 85 | 85 | 85 | 85 | 85 |
| Radius of curvature | 4.0374E−02 | 4.4938E−02 | 4.5737E−02 | 4.7209E−02 | 4.5470E−02 | 4.5439E−02 |
| Curvature | 2.4768E+01 | 2.2253E+01 | 2.1864E+01 | 2.1182E+01 | 2.1992E+01 | 2.2008E+01 |
| k | −1.0000E+00 | −1.0000E+00 | −1.0000E+00 | −1.0000E+00 | −1.0000E+00 | −1.0000E+00 |
| a2 | 0.0000E+00 | 0.0000E+00 | 0.0000E+00 | 0.0000E+00 | 0.0000E+00 | 0.0000E+00 |
| a4 | 8.2814E+02 | 6.6005E+02 | 5.9470E+02 | 6.3084E+02 | 6.4531E+02 | 6.0836E+02 |
| a6 | −6.5594E+04 | −3.9606E+04 | −3.3495E+04 | −3.5940E+04 | −4.0677E+04 | −3.4542E+04 |
| a8 | 2.1061E+06 | 9.0960E+05 | 7.1775E+05 | 7.9987E+05 | 1.0632E+06 | 7.3845E+05 |
| a10 | −2.6162E+07 | −7.3787E+06 | −5.3784E+06 | −6.3889E+06 | −1.1027E+07 | −5.4006E+06 |
| Sag | 0.3397 | 3.2390E−01 | 3.1843E−01 | 3.1641E−01 | 3.1965E−01 | 3.2021E−01 |
| Aspect ratio | 1.1322 | 1.0797 | 1.0614 | 1.0547 | 1.0655 | 1.0674 |
| Curvature ratio | 1.0000E+00 | 8.9845E−01 | 8.8276E−01 | 8.5522E−01 | 8.8793E−01 | 8.8855E−01 |

According to Table 10 the curvature ratio of each microlens of 85-1, 85-2, 85-3, 85-4 and 85-5 is less than 0.9.

Table 11 shows the shape of each microlens of 85-1', 85-2', 85-3', 85-4' and 85-5'.

TABLE 11

| Film | Comparative example 1 | Comparative example 2 | Comparative example 3 | Comparative example 4 | Comparative example 5 |
|---|---|---|---|---|---|
| D | 85 | 85 | 85 | 85 | 85 |
| Radius of curvature | 4.0294E−02 | 4.0258E−02 | 4.0995E−02 | 4.1024E−02 | 4.2097E−02 |
| Curvature | 2.4818E+01 | 2.4840E+01 | 2.4393E+01 | 2.4376E+01 | 2.3755E+01 |
| k | −1.0000E+00 | −1.0000E+00 | −1.0000E+00 | −1.0000E+00 | −1.0000E+00 |
| a2 | 0.0000E+00 | 0.0000E+00 | 0.0000E+00 | 0.0000E+00 | 0.0000E+00 |
| a4 | 8.2222E+02 | 8.2420E+02 | 7.9888E+02 | 7.9725E+02 | 7.3129E+02 |
| a6 | −6.5120E+04 | −6.5415E+04 | −6.0652E+04 | −6.0411E+04 | −5.1687E+04 |
| a8 | 2.0905E+06 | 2.1042E+06 | 1.8607E+06 | 1.8495E+06 | 1.4721E+06 |
| a10 | −2.5982E+07 | −2.6200E+07 | −2.2071E+07 | −2.1893E+07 | −1.6223E+07 |
| Sag | 0.3397 | 0.3398 | 0.3376 | 0.3375 | 0.3324 |
| Aspect ratio | 1.1322 | 1.1327 | 1.1253 | 1.1249 | 1.1082 |
| Curvature ratio | 1.0020E+00 | 1.0029E+00 | 9.8486E−01 | 9.8416E−01 | 9.5909E−01 |

Table 12 shows the shape of each microlens of 80-0, 80-1, 80-2, 80-3, 80-4 and 80-5.

TABLE 12

| Film | Without film | Example 1 | Example 2 | Example 3 | Example 4 | Example 5 |
|---|---|---|---|---|---|---|
| D | 80 | 80 | 80 | 80 | 80 | 80 |
| Radius of curvature | 4.7282E−02 | 5.1162E−02 | 5.1408E−02 | 5.2650E−02 | 5.0906E−02 | 5.1370E−02 |
| Curvature | 2.1150E+01 | 1.9546E+01 | 1.9452E+01 | 1.8993E+01 | 1.9644E+01 | 1.9467E+01 |
| k | −1.0000E+00 | −1.0000E+00 | −1.0000E+00 | −1.0000E+00 | −1.0000E+00 | −1.0000E+00 |
| a2 | 0.0000E+00 | 0.0000E+00 | 0.0000E+00 | 0.0000E+00 | 0.0000E+00 | 0.0000E+00 |
| a4 | 5.1612E+02 | 4.3873E+02 | 4.1883E+02 | 4.4718E+02 | 4.6313E+02 | 4.1983E+02 |
| a6 | −3.2695E+04 | −2.1939E+04 | −2.0873E+04 | −2.2013E+04 | −2.5875E+04 | −2.0778E+04 |
| a8 | 8.8587E+05 | 4.4747E+05 | 4.4195E+05 | 4.4388E+05 | 6.4153E+05 | 4.3246E+05 |
| a10 | −9.7424E+06 | −3.5288E+06 | −3.8754E+06 | −3.3812E+06 | −6.6839E+06 | −3.6913E+06 |
| Sag | 0.2977 | 2.8644E−01 | 2.8404E−01 | 2.8358E−01 | 2.8661E−01 | 2.8443E−01 |

TABLE 12-continued

| Film | Without film | Example 1 | Example 2 | Example 3 | Example 4 | Example 5 |
|---|---|---|---|---|---|---|
| Aspect ratio | 0.9923 | 0.9548 | 0.9468 | 0.9453 | 0.9554 | 0.9481 |
| Curvature ratio | 1.0000E+00 | 9.2416E−01 | 9.1975E−01 | 8.9805E−01 | 9.2881E−01 | 9.2042E−01 |

According to Table 12 the curvature ratio of each microlens of 80-1, 80-2, 80-3, 80-4 and 80-5 is less than 0.95.

Table 13 shows the shape of each microlens of 80-1', 80-2', 80-3', 80-4' and 80-5'.

TABLE 13

| Film | Comparative example 1 | Comparative example 2 | Comparative example 3 | Comparative example 4 | Comparative example 5 |
|---|---|---|---|---|---|
| D | 80 | 80 | 80 | 80 | 80 |
| Radius of curvature | 4.7208E−02 | 4.7182E−02 | 4.7881E−02 | 4.7903E−02 | 4.8616E−02 |
| Curvature | 2.1183E+01 | 2.1194E+01 | 2.0885E+01 | 2.0875E+01 | 2.0569E+01 |
| k | −1.0000E+00 | −1.0000E+00 | −1.0000E+00 | −1.0000E+00 | −1.0000E+00 |
| a2 | 0.0000E+00 | 0.0000E+00 | 0.0000E+00 | 0.0000E+00 | 0.0000E+00 |
| a4 | 5.1378E+02 | 5.1466E+02 | 4.9714E+02 | 4.9636E+02 | 4.7158E+02 |
| a6 | −3.2684E+04 | −3.2794E+04 | −3.0114E+04 | −3.0018E+04 | −2.7372E+04 |
| a8 | 8.9251E+05 | 8.9692E+05 | 7.7649E+05 | 7.7267E+05 | 6.8073E+05 |
| a10 | −9.9272E+06 | −9.9895E+06 | −8.1327E+06 | −8.0791E+06 | −6.9586E+06 |
| Sag | 0.2976 | 0.2977 | 0.2957 | 0.2957 | 0.2927 |
| Aspect ratio | 0.9921 | 0.9924 | 0.9858 | 0.9855 | 0.9757 |
| Curvature ratio | 1.0016E+00 | 1.0021E+00 | 9.8750E−01 | 9.8704E−01 | 9.7256E−01 |

Table 14 shows the shape of each microlens of 75-0, 75-1, 75-2, 75-3, 75-4 and 75-5.

TABLE 14

| Film | Without film | Example 1 | Example 2 | Example 3 | Example 4 | Example 5 |
|---|---|---|---|---|---|---|
| D | 75 | 75 | 75 | 75 | 75 | 75 |
| Radius of curvature | 5.3213E−02 | 5.6627E−02 | 5.6541E−02 | 5.7825E−02 | 5.6036E−02 | 5.6603E−02 |
| Curvature | 1.8793E+01 | 1.7660E+01 | 1.7686E+01 | 1.7294E+01 | 1.7846E+01 | 1.7667E+01 |
| k | −1.0000E+00 | −1.0000E+00 | −1.0000E+00 | −1.0000E+00 | −1.0000E+00 | −1.0000E+00 |
| a2 | 0.0000E+00 | 0.0000E+00 | 0.0000E+00 | 0.0000E+00 | 0.0000E+00 | 0.0000E+00 |
| a4 | 3.7259E+02 | 3.3436E+02 | 3.2738E+02 | 3.4488E+02 | 3.5870E+02 | 3.2670E+02 |
| a6 | −2.1706E+04 | −1.6411E+04 | −1.6365E+04 | −1.6467E+04 | −1.9400E+04 | −1.6223E+04 |
| a8 | 5.8734E+05 | 3.8453E+05 | 4.0113E+05 | 3.6613E+05 | 5.0630E+05 | 3.9503E+05 |
| a10 | −6.8331E+06 | −4.1016E+06 | −4.5178E+06 | −3.5941E+06 | −5.8216E+06 | −4.4379E+06 |
| Sag | 0.2640 | 2.5594E−01 | 2.5508E−01 | 2.5471E−01 | 2.5759E−01 | 2.5503E−01 |
| Aspect ratio | 0.8798 | 0.8531 | 0.8503 | 0.8490 | 0.8586 | 0.8501 |
| Curvature ratio | 1.0000E+00 | 9.3971E−01 | 9.4113E−01 | 9.2024E−01 | 9.4961E−01 | 9.4010E−01 |

Table 15 shows the shape of each microlens of 75-1', 75-2', 75-3', 75-4' and 75-5'.

TABLE 15

| Film | Comparative example 1 | Comparative example 2 | Comparative example 3 | Comparative example 4 | Comparative example 5 |
|---|---|---|---|---|---|
| D | 75 | 75 | 75 | 75 | 75 |
| Radius of curvature | 5.3122E−02 | 5.3102E−02 | 5.3754E−02 | 5.3772E−02 | 5.4260E−02 |
| Curvature | 1.8825E+01 | 1.8832E+01 | 1.8603E+01 | 1.8597E+01 | 1.8430E+01 |
| k | −1.0000E+00 | −1.0000E+00 | −1.0000E+00 | −1.0000E+00 | −1.0000E+00 |
| a2 | 0.0000E+00 | 0.0000E+00 | 0.0000E+00 | 0.0000E+00 | 0.0000E+00 |
| a4 | 3.7230E+02 | 3.7272E+02 | 3.6190E+02 | 3.6151E+02 | 3.5125E+02 |
| a6 | −2.1875E+04 | −2.1923E+04 | −2.0405E+04 | −2.0362E+04 | −1.9428E+04 |
| a8 | 5.9943E+05 | 6.0112E+05 | 5.3833E+05 | 5.3682E+05 | 5.1095E+05 |
| a10 | −7.0676E+06 | −7.0891E+06 | −6.1812E+06 | −6.1624E+06 | −5.9261E+06 |

TABLE 15-continued

| Film | Comparative example 1 | Comparative example 2 | Comparative example 3 | Comparative example 4 | Comparative example 5 |
|---|---|---|---|---|---|
| Sag | 0.2640 | 0.2640 | 0.2624 | 0.2624 | 0.2607 |
| Aspect ratio | 0.8799 | 0.8801 | 0.8748 | 0.8746 | 0.8689 |
| Curvature ratio | 1.0017E+00 | 1.0021E+00 | 9.8993E−01 | 9.8959E−01 | 9.8069E−01 |

Table 16 shows the shape of each microlens of 70-0, 70-1, 70-2, 70-3, 70-4 and 70-5.

TABLE 16

| Film | Without film | Example 1 | Example 2 | Example 3 | Example 4 | Example 5 |
|---|---|---|---|---|---|---|
| D | 70 | 70 | 70 | 70 | 70 | 70 |
| Radius of curvature | 5.9182E−02 | 6.2220E−02 | 6.1919E−02 | 6.3381E−02 | 6.1541E−02 | 6.2016E−02 |
| Curvature | 1.6897E+01 | 1.6072E+01 | 1.6150E+01 | 1.5778E+01 | 1.6249E+01 | 1.6125E+01 |
| k | −1.0000E+00 | −1.0000E+00 | −1.0000E+00 | −1.0000E+00 | −1.0000E+00 | −1.0000E+00 |
| a2 | 0.0000E+00 | 0.0000E+00 | 0.0000E+00 | 0.0000E+00 | 0.0000E+00 | 0.0000E+00 |
| a4 | 2.8824E+02 | 2.6890E+02 | 2.6633E+02 | 2.7665E+02 | 2.8710E+02 | 2.6569E+02 |
| a6 | −1.6829E+04 | −1.3938E+04 | −1.4110E+04 | −1.3782E+04 | −1.5873E+04 | −1.4018E+04 |
| a8 | 4.9341E+05 | 3.8422E+05 | 3.9981E+05 | 3.5970E+05 | 4.5366E+05 | 3.9675E+05 |
| a10 | −6.3463E+06 | −4.8835E+06 | −5.1767E+06 | −4.3453E+06 | −5.7687E+06 | −5.1457E+06 |
| Sag | 0.2342 | 2.2853E−01 | 2.2845E−01 | 2.2774E−01 | 2.3039E−01 | 2.2829E−01 |
| Aspect ratio | 0.7807 | 0.7618 | 0.7615 | 0.7591 | 0.7680 | 0.7610 |
| Curvature ratio | 1.0000E+00 | 9.5117E−01 | 9.5580E−01 | 9.3375E−01 | 9.6167E−01 | 9.5430E−01 |

Table 17 shows the shape of each microlens of 70-1', 70-2', 70-3', 70-4' and 70-5'.

TABLE 17

| Film | Comparative example 1 | Comparative example 2 | Comparative example 3 | Comparative example 4 | Comparative example 5 |
|---|---|---|---|---|---|
| D | 70 | 70 | 70 | 70 | 70 |
| Radius of curvature | 5.9069E−02 | 5.9054E−02 | 5.9648E−02 | 5.9663E−02 | 5.9988E−02 |
| Curvature | 1.6929E+01 | 1.6934E+01 | 1.6765E+01 | 1.6761E+01 | 1.6670E+01 |
| k | −1.0000E+00 | −1.0000E+00 | −1.0000E+00 | −1.0000E+00 | −1.0000E+00 |
| a2 | 0.0000E+00 | 0.0000E+00 | 0.0000E+00 | 0.0000E+00 | 0.0000E+00 |
| a4 | 2.8872E+02 | 2.8893E+02 | 2.8239E+02 | 2.8220E+02 | 2.7784E+02 |
| a6 | −1.7021E+04 | −1.7043E+04 | −1.6158E+04 | −1.6138E+04 | −1.5792E+04 |
| a8 | 5.0410E+05 | 5.0481E+05 | 4.7012E+05 | 4.6948E+05 | 4.6217E+05 |
| a10 | −6.5310E+06 | −6.5393E+06 | −6.0570E+06 | −6.0498E+06 | −6.0125E+06 |
| Sag | 0.2343 | 0.2343 | 0.2331 | 0.2331 | 0.2321 |
| Aspect ratio | 0.7810 | 0.7812 | 0.7770 | 0.7769 | 0.7738 |
| Curvature ratio | 1.0019E+00 | 1.0022E+00 | 9.9219E−01 | 9.9194E−01 | 9.8657E−01 |

Table 18 shows the efficiency and the shape of each optical element of 85-0, 85-1, 85-2, 85-3, 85-4, 85-5, 85-1', 85-2', 85-3', 85-4' and 85-5' for ready comparison.

TABLE 18

| Film | D | Efficiency | Comparison of efficiency | Z/P | {T(0)/T(D)}/{T(0)/T(D)} |
|---|---|---|---|---|---|
| Without film | 85 | 67.4% | 100.0% | 113.2% | 100.0% |
| Example 1 | 85 | 73.6% | 109.2% | 108.0% | 76.8% |
| Example 2 | 85 | 73.5% | 109.1% | 106.1% | 67.7% |
| Example 3 | 85 | 75.0% | 111.3% | 105.5% | 61.9% |
| Example 4 | 85 | 76.7% | 113.8% | 106.6% | 65.1% |
| Example 5 | 85 | 77.2% | 114.5% | 106.7% | 71.7% |
| Comparative example 1 | 85 | 71.2% | 105.7% | 113.2% | 100.4% |

TABLE 18-continued

| Film | D | Efficiency | Comparison of efficiency | Z/P | {T(0)/T(D)}/{T(0)/T(D)} |
|---|---|---|---|---|---|
| Comparative example 2 | 85 | 71.2% | 105.7% | 113.3% | 100.6% |
| Comparative example 3 | 85 | 72.4% | 107.4% | 112.5% | 97.9% |
| Comparative example 4 | 85 | 72.4% | 107.5% | 112.5% | 97.7% |
| Comparative example 5 | 85 | 74.3% | 110.3% | 110.8% | 89.0% |

According to Table 18 the efficiency of each optical element of 85-1, 85-2, 85-3, 85-4 and 85-5 is higher by 9 percent or more than the efficiency of the optical element of 85-0. The aspect ratio (Z/P) of each microlens of 85-1, 85-2, 85-3, 85-4 and 85-5 is 1 or greater and 96 percent of the aspect ratio of each microlens of 85-0 or smaller.

Table 19 shows the efficiency and the shape of each optical element of 80-0, 80-1, 80-2, 80-3, 80-4, 80-5, 80-1', 80-2', 80-3', 80-4' and 80-5' for ready comparison.

TABLE 19

| Film | D | Efficiency | Comparison of efficiency | Z/P | {T(0)/T(D)}/ {T(0)/T(D)} |
|---|---|---|---|---|---|
| Without film | 80 | 74.3% | 100.0% | 99.2% | 100.0% |
| Example 1 | 80 | 79.1% | 106.4% | 95.5% | 81.1% |
| Example 2 | 80 | 77.9% | 104.8% | 94.7% | 75.9% |
| Example 3 | 80 | 78.9% | 106.1% | 94.5% | 73.5% |
| Example 4 | 80 | 80.8% | 108.7% | 95.5% | 76.9% |
| Example 5 | 80 | 82.2% | 110.6% | 94.8% | 77.4% |
| Comparative example 1 | 80 | 78.6% | 105.8% | 99.2% | 99.9% |
| Comparative example 2 | 80 | 78.6% | 105.7% | 99.2% | 100.1% |
| Comparative example 3 | 80 | 79.7% | 107.2% | 98.6% | 97.2% |
| Comparative example 4 | 80 | 79.7% | 107.2% | 98.6% | 97.0% |
| Comparative example 5 | 80 | 80.9% | 108.8% | 97.6% | 91.2% |

According to Table 19 the efficiency of each optical element of 80-0, 80-1, 80-2, 80-3, 80-4 and 80-5 is higher by 4 percent or more than the efficiency of the optical element of 80-0. The aspect ratio (Z/P) of each microlens of 80-0, 80-1, 80-2, 80-3, 80-4 and 80-5 is 0.9 or greater and 97 percent of the aspect ratio of each microlens of 80-0 or smaller.

Table 20 shows the efficiency and the shape of each optical element of 75-0, 75-1, 75-2, 75-3, 75-4, 75-5, 75-1', 75-2', 75-3', 75-4' and 75-5' for ready comparison.

TABLE 20

| Film | D | Efficiency | Comparison of efficiency | Z/P | (T(0)/T(D)}/ {T(0)/T(D)} |
|---|---|---|---|---|---|
| Without film | 75 | 78.4% | 100.0% | 88.0% | 100.0% |
| Example 1 | 75 | 82.0% | 104.6% | 85.3% | 84.8% |
| Example 2 | 75 | 80.3% | 102.4% | 85.0% | 82.1% |
| Example 3 | 75 | 81.3% | 103.6% | 84.9% | 81.1% |
| Example 4 | 75 | 83.4% | 106.3% | 85.9% | 85.0% |
| Example 5 | 75 | 84.9% | 108.3% | 85.0% | 82.5% |
| Comparative example 1 | 75 | 82.9% | 105.7% | 88.0% | 99.9% |
| Comparative example 2 | 75 | 82.9% | 105.7% | 88.0% | 100.0% |
| Comparative example 3 | 75 | 83.8% | 106.9% | 87.5% | 97.2% |
| Comparative example 4 | 75 | 83.9% | 107.0% | 87.5% | 97.1% |
| Comparative example 5 | 75 | 84.6% | 107.9% | 86.9% | 93.2% |

According to Table 20 the efficiency of each optical element of 75-1, 75-2, 75-3, 75-4 and 75-5 is higher by 2 percent or more than the efficiency of the optical element of 75-0. The aspect ratio (Z/P) of each microlens of 75-1, 75-2, 75-3, 75-4 and 75-5 is 0.8 or greater and 98 percent of the aspect ratio of each microlens of 75-0 or smaller.

Table 21 shows the efficiency and the shape of each optical element of 70-0, 70-1, 70-2, 70-3, 70-4, 70-5, 70-1', 70-2', 70-3', 70-4' and 70-5' for ready comparison.

TABLE 21

| Film | D | Efficiency | Comparison of efficiency | Z/P | {T(0)/T(D)}/ {T(0)/T(D)} |
|---|---|---|---|---|---|
| Without film | 70 | 81.2% | 100.0% | 78.1% | 100.0% |
| Example 1 | 70 | 84.0% | 103.4% | 76.2% | 87.8% |
| Example 2 | 70 | 81.9% | 100.8% | 76.1% | 86.8% |
| Example 3 | 70 | 83.0% | 102.2% | 75.9% | 85.9% |
| Example 4 | 70 | 85.3% | 105.0% | 76.8% | 90.1% |
| Example 5 | 70 | 86.6% | 106.6% | 76.1% | 86.7% |
| Comparative example 1 | 70 | 85.9% | 105.7% | 78.1% | 100.0% |
| Comparative example 2 | 70 | 85.8% | 105.7% | 78.1% | 100.1% |
| Comparative example 3 | 70 | 86.7% | 106.7% | 77.7% | 97.6% |
| Comparative example 4 | 70 | 86.7% | 106.7% | 77.7% | 97.5% |
| Comparative example 5 | 70 | 87.1% | 107.2% | 77.4% | 95.0% |

According to Table 21 the efficiency of each optical element of 70-0, 70-1, 70-2, 70-3, 70-4 and 70-5 is higher by 0.8 percent or more than the efficiency of the optical element of 70-0. The aspect ratio (Z/P) of each microlens of 70-0, 70-1, 70-2, 70-3, 70-4 and 70-5 is 0.7 or greater and smaller than 0.8 and 99 percent of the aspect ratio of each microlens of 70-0 or smaller.

What is claimed is:

1. A combination of an optical element and an antireflection film, the optical element being provided with a microlens array on a first surface and being configured so as to receive a light beam through the first surface, the light beam being parallel to a reference axis parallel to the central axis of each microlens, and to make the light beam go out through a second surface while diverging the light beam such that the maximum value of an angle that a diverged ray of light and the reference axis form in a plane containing the reference axis is D, wherein each microlens is configured such that $$Z/P \geq 0.8$$

is satisfied, where Z represents distance between the vertex and the bottom and P represents the diameter of the smallest circle enclosing the bottom and the antireflection film being designed such that $$\{T(0)/T(D)\}/\{T'(0)/T'(D)\} \le 0.85$$

is satisfied, where T(0) represents transmittance of the film formed on a substrate made of the same material as that of the optical element for an incident ray at the angle of incidence of 0, T(D) represents transmittance of the film formed on the substrate for an incident ray at the angle of incidence of D, T'(0) represents transmittance of the substrate without an antireflection film for an incident ray at the angle of incidence of 0 and T'(D) represents transmittance of the substrate without an antireflection film for an incident ray at the angle of incidence of D, wherein the antireflection film is provided on the second surface so as to realize a target intensity distribution of diverged rays, the distribution being a function of angle with respect to the reference axis and an area of a minute portion of the surface of each microlens, on which an angle of incidence of a ray that travels in the direction parallel to the reference axis is θ, is determined associated with transmittance of the optical element and the antireflection film for the ray that has passed through the minute portion and a target intensity of the ray that has been diverged.

2. An optical element that is provided with a microlens array on a first surface and an antireflection film on a second surface and is configured so as to receive a light beam through the first surface, the light beam being parallel to the central axis of each microlens, and to make the light beam go out through the second surface while diverging the light beam in such a way that the maximum value of an angle that a diverged ray of light forms with the central axis is D, wherein each microlens is configured such that $$Z/P \ge 0.8$$

is satisfied, where Z represents distance between the vertex and the bottom and P represents the diameter of the smallest circle enclosing the bottom, wherein the antireflection film is formed such that $$\{T(0)/T(D)\}/\{T'(0)/T'(D)\} \le 0.85$$

is satisfied, where T(0) represents transmittance for an incident ray at the angle of incidence of 0 is, T(D) represents transmittance for an incident ray at the angle of incidence of D, T'(0) represents transmittance of the optical element proper without an antireflection film for an incident ray at the angle of incidence of 0 and T'(D) represents transmittance of the optical element proper without an antireflection film for an incident ray at the angle of incidence of D, and wherein $$\{T(0)/T(D)\}/\{(T^{\wedge\prime}(0))/(T^{\wedge\prime}(D))\} \le Z/P$$

is further satisfied.

3. The optical element according to claim 2, wherein D is 75 degrees or greater.

4. The optical element according to claim 2, wherein D is 80 degrees or greater.

5. The optical element according to claim 2, wherein D is 85 degrees or greater.

6. A method of producing an optical element provided with a microlens array on a first surface and an antireflection film on a second surface, the optical element being configured so as to receive a light beam through the first surface, the light beam being parallel to a reference axis parallel to the central axis of each microlens, and to make the light beam go out through the second surface while diverging the light beam such that the maximum value of an angle that a diverged ray of light and the reference axis form in a plane containing the reference axis is D, wherein each microlens is configured such that $$Z/P \ge 0.8$$

is satisfied, where Z represents distance between the vertex and the bottom and P represents the diameter of the smallest circle enclosing the bottom, wherein the method includes designing an antireflection film such that $$\{T(0)/T(D)\}/\{T'(0)/T'(D)\} \le 0.85$$

is satisfied, where T(0) represents transmittance of the film formed on a substrate made of the same material as that of the optical element for an incident ray at the angle of incidence of 0, T(D) represents transmittance of the film formed on the substrate for an incident ray at the angle of incidence of D, T'(0) represents transmittance of the substrate without an antireflection film for an incident ray at the angle of incidence of 0 and T'(D) represents transmittance of the substrate without an antireflection film for an incident ray at the angle of incidence of D, obtaining transmittance of the optical element and the antireflection film for a ray that travels in the direction parallel to the reference axis, enters the microlens, the angle of incidence being θ, and passes through the optical element and the antireflection film, obtaining a target intensity on the surface of each microlens of the ray with the angle of incidence of θ, using the transmittance of the optical element and the antireflection film for the ray with the angle of incidence of θ and a target intensity distribution of diverged rays, the distribution being a function of angle with respect to the reference axis, and determining the shape of the surface of each microlens by determining an area of a minute portion of the surface of each microlens, on which an angle of incidence of a ray that travels in the direction parallel to the reference axis is θ, such that the target intensity on the surface of each microlens of the ray with the angle of incidence of θ is realized.

* * * * *